(12) United States Patent
Harper et al.

(10) Patent No.: US 9,497,150 B2
(45) Date of Patent: Nov. 15, 2016

(54) SYSTEM AND METHOD FOR MANAGING ELECTRONIC CONVERSATIONS

(71) Applicant: Tuul, Inc., Alameda, CA (US)

(72) Inventors: Tom Harper, Orinda, CA (US); Toby Corey, Santa Cruz, CA (US); Wayne Tsuchitani, Santa Cruz, CA (US)

(73) Assignee: TUUL, INC., Alameda, CA (US)

( * ) Notice: Subject to any disclaimer, the term of this patent is extended or adjusted under 35 U.S.C. 154(b) by 205 days.

(21) Appl. No.: 14/326,084

(22) Filed: Jul. 8, 2014

(65) Prior Publication Data

US 2016/0014064 A1  Jan. 14, 2016

(51) Int. Cl.
*G06F 15/16* (2006.01)
*H04L 12/58* (2006.01)

(52) U.S. Cl.
CPC ............ *H04L 51/16* (2013.01); *H04L 51/046* (2013.01)

(58) Field of Classification Search
USPC ....................................... 709/206, 204, 205
See application file for complete search history.

(56) References Cited

U.S. PATENT DOCUMENTS

| | | |
|---|---|---|
| 2009/0019372 A1 | 1/2009 | Chu et al. |
| 2009/0319615 A1 | 12/2009 | Caunter et al. |
| 2010/0011373 A1* | 1/2010 | Youel .................. G06Q 10/107 719/313 |
| 2012/0071179 A1 | 3/2012 | Gonzalez Escribano |
| 2012/0173638 A1* | 7/2012 | Vymenets ............ G06Q 10/103 709/206 |
| 2013/0090973 A1 | 4/2013 | Hui et al. |
| 2013/0332547 A1 | 12/2013 | Tousignant et al. |
| 2014/0229557 A1* | 8/2014 | Dietz .................. H04L 12/1822 709/206 |
| 2014/0324993 A1* | 10/2014 | Li ....................... H04L 12/1818 709/206 |
| 2014/0359022 A1* | 12/2014 | Buddenbaum .......... H04L 51/32 709/206 |

FOREIGN PATENT DOCUMENTS

WO   2011/055013   12/2011

* cited by examiner

*Primary Examiner* — Liangche A Wang
(74) *Attorney, Agent, or Firm* — David R. Stevens; Stevens Law Group

(57) ABSTRACT

A system provides a conversation construct for the routing of external communications to a party within an entity. Internal interactions of individuals in the entity may be associated by a server system with the conversation construct. Messages may be associated with interactions that may have as participants less than all participants of a conversation construct. An interaction may be a backchannel interaction and exclude one or more participants of a parent interaction. Interactions may be grouped into sequences that likewise may have a limited set of participants. A sequence may have a state associated therewith used by the entity to track progress in achieving an objective. A conversation construct and the sequences and interactions thereof may be presented in an interface to a user that includes those portions of the conversation construct for which the user is a participant.

21 Claims, 16 Drawing Sheets

SYSTEM AND METHOD FOR MANAGING ELECTRONIC CONVERSATIONS

BACKGROUND

1. Field of the Invention

This invention relates to systems and methods for managing electronic conversations.

2. Background of the Invention

Computers and mobile devices are enabled with multiple networking input/output capabilities, including Ethernet and wireless (cellular and WiFi bands). These multiple data channels are now commonly used for communication services, including text, voice, video, gestures and other sensor data. These services might be carried over a number of different protocol services, including SMS, EMS, MMS (media messaging), and various formats that are carried over internet protocol based services and such as XMPP, SMTP, SIP, RTP, etc.

In terms of scope, SMS messages are only text based. MMS and other proprietary text focused message services have expanded their scope to allow richer user interaction and incorporate multimedia, including emoticons, audio, video, etc. In terms of person to person or peer to peer (p2p) interaction text messaging, XMPP, iMessage™, Skype™, Facebook™, Whatsapp™, Wechat™ and other proprietary applications and standards which allow for group messaging all follow the same standard models of interaction between two or more parties messaging each other:

1. Messages are sent directly between 2 or more parties via an available network intermediary or via a p2p networking technology.
2. People are added to the conversation or chat room individually by someone inviting them to join, usually a person creating the "room" or "conversation."
3. The chat "room" itself may be given a label or tag, or alias.
4. As people are added to conversations, they may or may not have full access to the conversation history before the moment—frequently they do not.
5. When people are removed from the conversation, their history remains but they see no future messages.
6. The conversation or room, has no termination point, other than when people leave or stop posting messages to the conversation.
7. One conversation has no relation to other conversations
8. Messages are shared back and forth and synchronized between all participants, usually in terms of the time first received by the intermediary, though the time of send and previous message may be considered as well
9. Messages are typically linked historically with parent and/or child messages, and/or temporally related to messages in the same conversation
10. Messages are usually given a multimedia type
11. Tags or topics prescribed to a given message to label the message
12. Updated messages may replace other messages
13. In terms of providing an action based on the incoming text message, there is not a way to interpret a message as having an activity associated with it.
14. There are a relatively limited number of states the message can exist in, such as sent, received, read, and replaced, and excludes states that would be specific to the payload content
15. Text as a protocol inside of the message is sometimes used as a mechanism to send emoticons, play games, sending a contact's information, or find commands for configuring the elements of the chat itself
16. There may be some method to gauge user interaction, such as "is typing", etc.
17. In terms of the interactivity with a room or group, sending message to the conversation always results in messages being sent to the same group of people that were directly added to the room or conversation—There is no dynamic element to the people available to respond—meaning the list of recipients is static, except when people are manually added or removed
18. There may additionally be some semantic interpretation of inbound text messages included in some instant messaging clients. The individual client may attempt to interpret the text of the inbound messages, such that when a date or time or location is sent, the client may attempt to interpret that information as an appointment at a given time of day.

The systems and methods disclosed in this application extend the capabilities of a mobile, or other, messaging platform to enable performance of complex tasks and the use of the platform to provide services in a more efficient manner.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
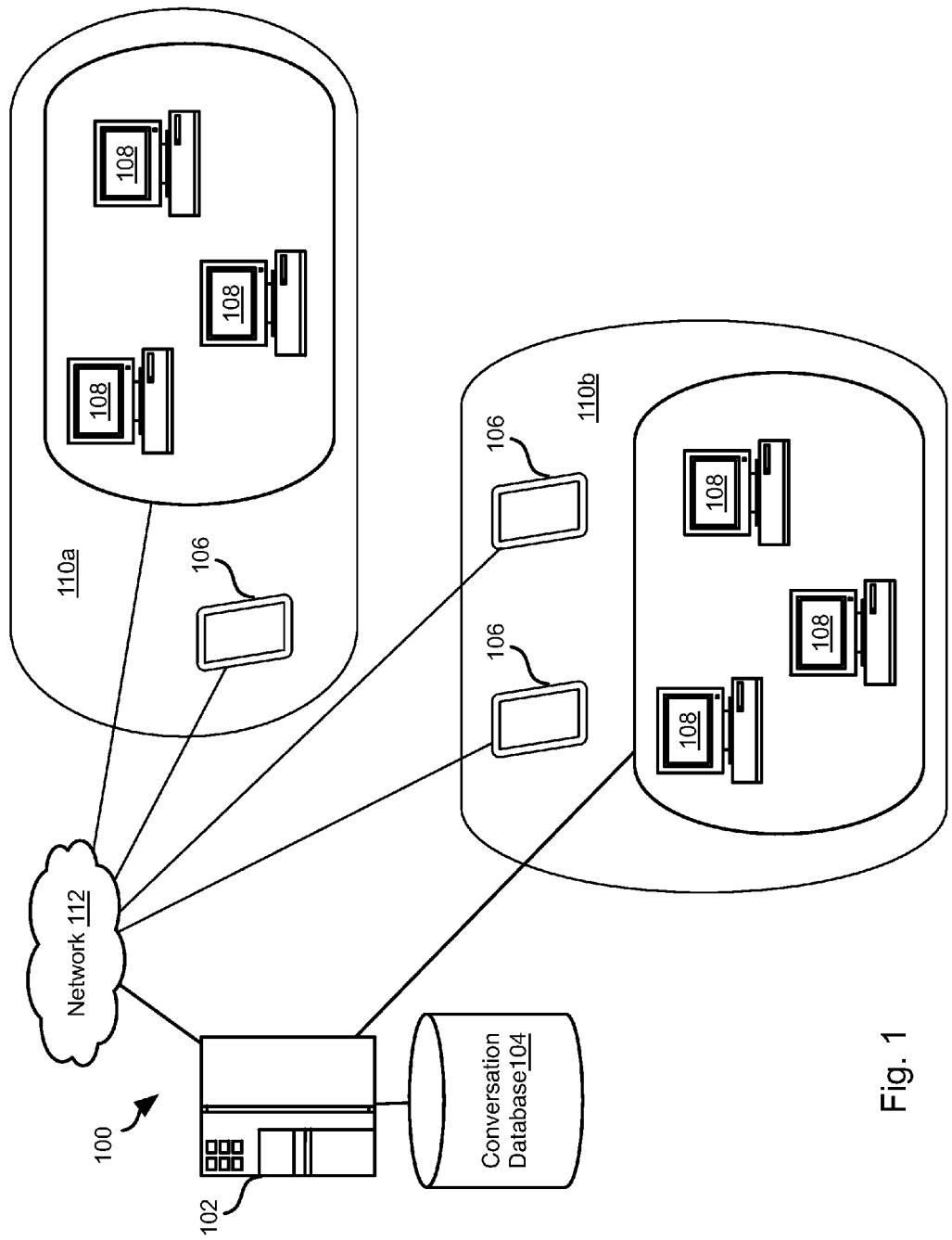
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

The standard model implemented by prior approaches as outlined in the Background section make the various instant-messaging solutions suitable for direct person-to-person interaction. However, when there is a need to a) interact among a group which represents many individuals (such as a business), b) there is a need to track multiple chats with unrelated people regarding a single subject, or c) have interactions which require a greater level of precision and workflow, then a purely text and multimedia based solution is inadequate. The systems and methods described herein provide for workflow and organizational aliasing. In some embodiments, systems and methods as disclosed herein may implement some or all of the principles and concepts below:

1. The customer may communicate with the business entity as though it were a person—i.e. I am calling BofA to find out my balance.
2. Direct contact via text, or other, message to people within an organization in prior approaches requires allowing open access to that person's contact information outside the organization—for the organization, it is not desirable or efficient to allow unrestricted access to most internal support resources, primarily from an expense standpoint.
3. The contact with the business may be controlled, routed, and monitored to ensure that user interactions are performed and handled successfully.
4. Contacts that result in actionable activities need to be precisely communicated to both the user and the business, so that an exact shared. understanding can be developed and expectations are properly set and met
5. The interaction with the customer might require further internal communication about the customer's needs, which may contain information that should not be shared with the customer.
6. The internal communications may be tracked in terms of a given contact with a customer to facilitate further future evaluation. These internal communications may be associated with the original conversation with the customer.
7. Conversations with a customer may need to be passed between different company representatives in order to be resolved properly.
8. From the customer's point of view, there may only ever be one continuing conversation with the company, even though multiple people from the company may be interacting with them.
9. From the company point of view, there are many distinct conversations about a single customer, which may have differing privacy requirements.
10. A resolution or end to the conversation may be defined so that it can be considered to be resolved on the company side, even though it may remain open ended on the customer side.
11. A conversation may occur between some group of people which inspires a number of further conversations, but a conversation thread in its prior implementation is not a desirable format for that ongoing discussion.
12. A personal event in someone's life may give rise to a large number of sub-interactions, such as a wedding, which may require business and personal interactions. These sub-interactions may be associated with a single conversation according to the methods described herein.
13. Where a professional event is happening such as a concert or open house, which requires the coordination and effort of a large number of related professional, a number of personal communications may be managed according to the methods described herein in order to help make the event happen Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the systems and methods disclosed herein may be implemented using the illustrated network environment 100. A server system 102 may access, and store data in, a conversation database 104 storing data for conversations conducted according to the methods described herein. The server system 102 may include one or more processors and one or more separate computing devices that may be co-located or remote from one another. The functions implemented by the server system 102 according to the methods described herein may also be implemented by a workstation or network of workstations.

The server system 102 may interact with mobile devices 106 (smart phones, tablet computers, wearable computers, or the like) as well as one or more workstation computers 108 (laptop computers, desktop computers, other servers, or the like). In some embodiments, a group 110a of mobile devices 106 and workstations 108 may be associated with an entity, e.g. a company or division of a company or other organization. Another group 110b of mobile devices 106 and workstations 108 may be associated with a different entity or simply be defined as devices not associated with the same entity as the first group 110a, i.e. the public at large. The systems and methods herein provide an improved approach to handling conversations that include both communications of an entity with those outside the entity as well as internal communications among individuals of the entity.

The server system 102, mobile devices 106, and workstations 108 may communicate with one another over a network 112 such as the Internet, local area network (LAN), wide area network (WAN) or any other network topology. Communication may be over any wired or wireless connection. In particular, at least a portion of the path between mobile devices 106 and the server 102 may be a cellular wireless network. Communication among the mobile devices 106 and workstations 108 of the group 110a may be over an internal, i.e. non-publically accessible network. Communication between devices of the group 110b and the group 110a may occur directly between the devices or be routed through the server system 102. Direct communication between devices from different groups 110a, 110b may be reported to the server system 102 in order to perform the methods described herein for managing communications.

Figure 2:
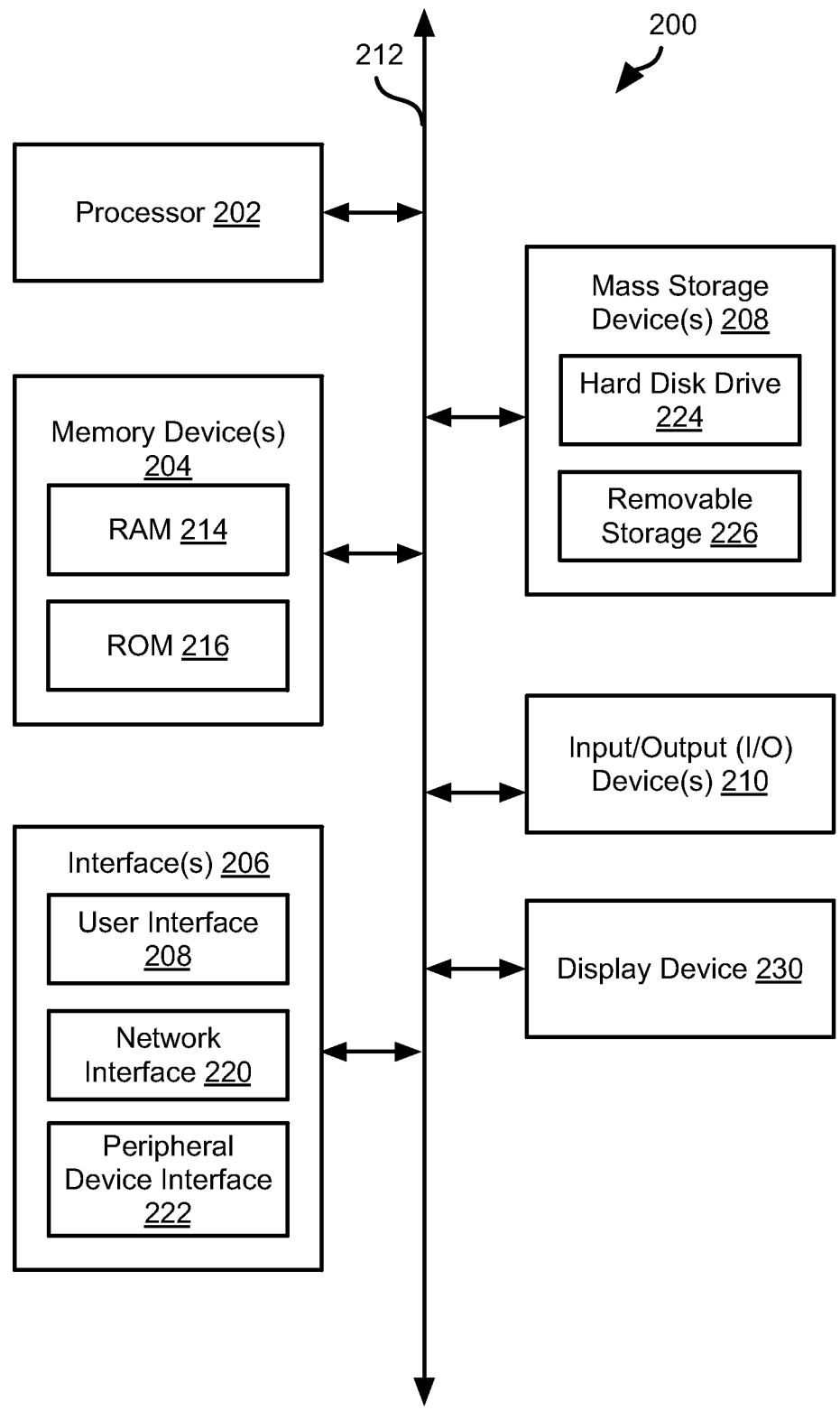
FIG. 2 is a schematic block diagram of a computer system suitable for implementing methods in accordance with an embodiment of the present invention.

FIG. 2 is a block diagram illustrating an example computing device 200. Computing device 200 may be used to perform various procedures, such as those discussed herein. A server system 102, mobile device 106, and workstation 108 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
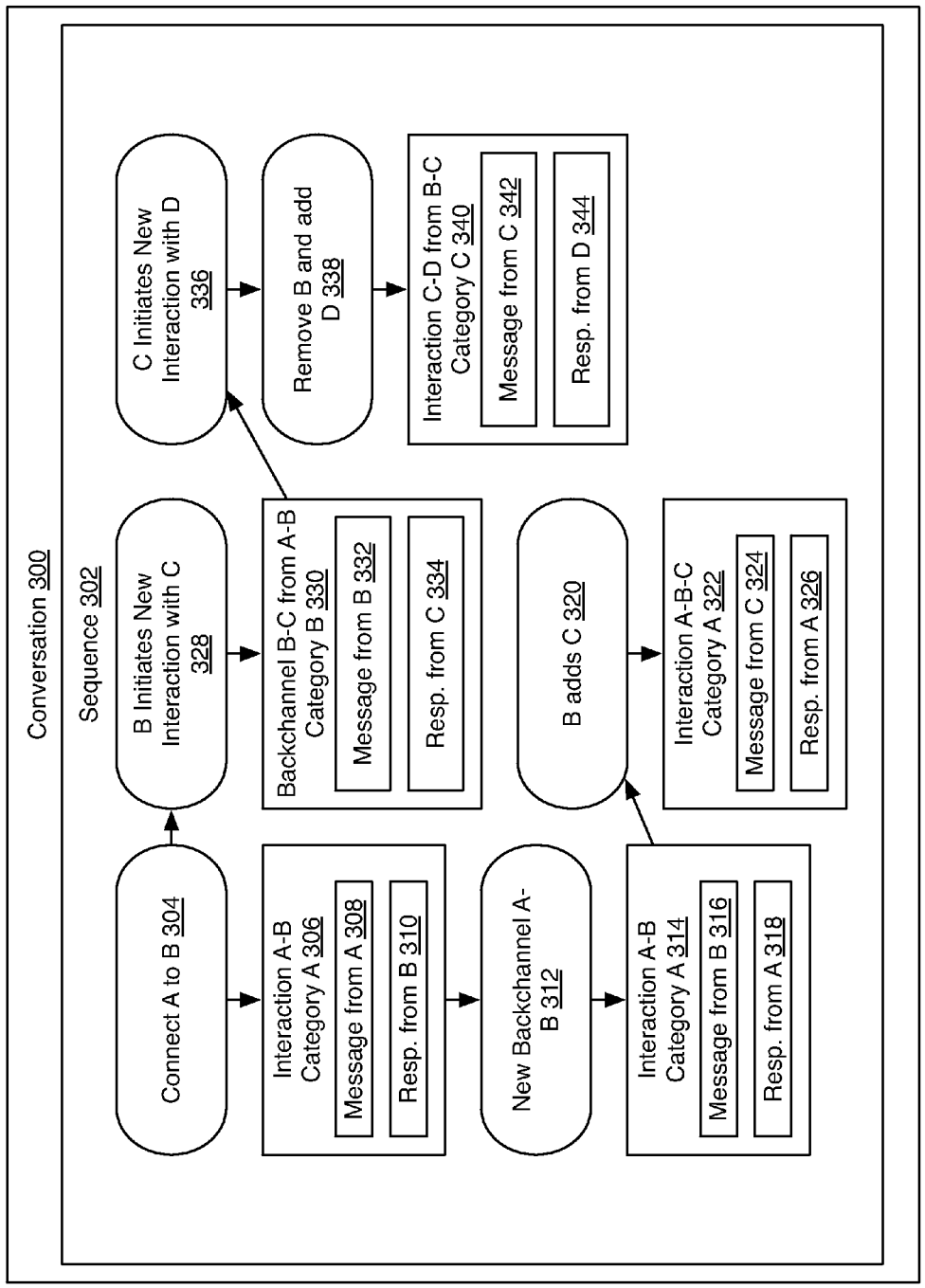
FIG. 3 is process flow diagram of a conversation in accordance with an embodiment of the present invention.

FIG. 3 illustrates a conversation 300 that has one or more sequences 302 associated therewith. Each sequence has one or more interactions between one or more groups associated therewith. A conversation 300 and its associated data may be stored, updated, reported, or otherwise made accessible by the server system 102 according to the methods described herein.

The conversation 300 may be a construct (e.g. a meta-conversation or container of many conversations), which represents a collection of N (where N can be any number) of sequences 302. A sequence 302 may be a collection also, and may be defined as a collection that contains M actual messaging sessions or message exchanges, which may be referred to as interactions. Each interaction is defined by the inclusion of one or more parties in collaboration, in which they send messages, data and media to each other (or themselves) via the available network and protocol for transmission and reception. An interaction is the unit by which communication occurs, in that the parties that are involved are attached, i.e. actually send and/or receive messages at that level. In some embodiments, an interaction may further include a sub-interaction, which is an interaction that is initiated based on an existing interaction or sub-interaction that already started. A sub-interaction may by definition exclude one or more parties that were involved in the parent interaction, but include one of the participants. A sub-interaction may further include new parties that were not participants in the parent interaction. A sub-interaction is also referred to herein as a "backchannel."

In summary, the conversation 300 may be a data structure and corresponding functions for containing multiple sequences of interactions and sub-interactions between multiple parties. The conversation 300 may contain the connections between discrete communications sessions via sequences that, though they may have differing parties and subject matter, still have temporal and contextual relationships between the contained interactions, while maintaining the privacy between one person's view of the interaction and others who may be involved.

In some embodiments, a conversation 300 is defined between a group of P individuals (here referred to as Group A) and a single party external to the group, or between group A and a separate similar group of R individuals B external to the group. In this form, each conversation has one permanent participant, and is defined in terms of the external party. The external party addresses group A via the conversation as an intermediary or proxy, and the external party may and will usually have no control over which individual they will speak with within the group. The routing of those messages is performed by the server system based on an internal system state, linguistic interpretation, and operational rules and logic as configured by the group for that conversation. A different group member may respond to the external party at a given time depending on the needs of the external and internal parties. In some embodiments, representatives of a group are not discoverable outside their group.

For example, electronic addressing information for parties C, D and E are not published and may not be enabled for communications from party A a-priori, and A may have no a-priori or electronic data channel with which to address parties C, D or E outside the scope of an intermediated interaction according the methods described herein. A server system 102 performing methods as described herein may access rules defining routing communications from party A to the same representative from among parties C, D, or E if the rules of the meta-conversation 300 for the group including parties C, D, and E are configured to allow it, and the representative is available. Otherwise the rules may instruct the server system 102 to route follow ups to an appropriate, e.g. available, other group member in the same group and that is specified in the routing rules as responding to similar requests.

In some embodiments, a conversation 300 is defined or classified based on a user identifier of the individual who started the conversation. This conversation may be ongoing, or have a discrete start and end. In such embodiments, an individual may or may not be part of a pre-defined group, and the individual may invite other public or private groups or individuals into sequences of interactions or sub-interactions of a conversation 300. In this manner, a conversation 300 may provide a data construct associated for organizing communications with respect to an event, a selected group of people, or an activity.

A sequence 302 may be a container for M (M being any representable number) of interactions. A sequence may have a subject, a categorical labeling, state, and start and end time. Each sequence 302 may have stored in the definition thereof a user identifier for a primary participant. In some embodiments, a sequence 302 may include messages from members of a group to an external party. Interactions, e.g. specific messages between members of the group and the external party, may be routed by the server system 102 according to rules or logic driven choice to a group organizational structure called a sub-group, or team. The sub-group organizational structure pertains to the group of people who are responders to the external party regarding that category. In this case a sequence 302 may include a primary interaction, which is one in a series of interactions or communications with the external party (e.g. a first interaction), and the primary participant may be stored in the sequence 302 as an identifier of the external party.

In some embodiments, a conversation 300 may be generated by a user without an interaction with another user or designation of another participant. Accordingly, an identifier of the user that generated the conversation may be stored in the conversation 300 as the primary participant. Other participants may be added by the user to the conversation such that they or the user may initiate a new sequence and interactions within that conversation 300.

A representation of a conversation 300 may be presented on a computing device, such as any of the computing devices 106, 108. For example, a specific portion of the conversation 300 may be selected by the server system 300 for display to a particular user. Hereinafter, the portion of a conversation 300 and sequence 302 made accessible by the server system 102 to a particular participant shall be referred to as the point of view (POV) of a particular participant in a sequence 302. Each sequence 302 may incorporate messages of one or more sub-conversations that are part of the sequence 302. The server system 102 may exclude any sequence or sub-conversation from the POV of an individual that does not include that individual as a participant unless specifically given privilege to do so by group rules accessible by the server and granting this authority. The group rules may be defined for the group at a system level, and the rules granting global or other visibility apply only to members of that group. In some embodiments, a default rule used by the server system 102 to determine an individual's POV may be that the POV of an individual does not include any conversation that does not include that individual. For example, the default behavior of the server system 102 is that the POV of a party in a conversation and sequence is restricted to the interactions in which the party directly participated. For example, an exception to the default rule may be allowed by conversational rules and convention of the server system 102, such that those users that are recorded to be administrators of a conversation 300 may have included in the POV thereof the sequences 302 and interactions contained in conversations, such that they can review interactions in which they did not directly participate.

As an example, in the interactions of a conversation 300 between two parties (A and B), from the perspective of party A, party B is having a continuous conversation with party A. However party B may be comprised of many group members, which are actually responding by proxy to party A (for example parties C, D and E). Parties C and E may only have in their POVs those interactions of the conversation with A in which they (C and E) were participants. Thus the portion of the conversation 300 with A in the POV of C will have a much more limited time and subject scope than the entirety of the conversation 300 between A and B. In particular party A may have a POV including all interactions of the conversation 300, including those of other sub-parties (for example E) regarding various subjects. These interactions may span multiple sub-conversations which happen between A and internal members of B. Additionally, parties C and D may participate in interactions within the scope of the conversation 300 with A, but party D may not have any interactions directly with A. Accordingly, the POV of A does not include the sub-conversation between C and D even though the sub-conversation between C and D is part of the conversation 300 including A as the primary participant. In the POV of the company or group B in the conversation 300 with A, all interactions between A, C, and D are related as branches of a tree representing the conversation 300, i.e. as sub-conversations of the conversation 300. In some embodiments, sub-conversations that are internal to group B (e.g. the example conversation between C and D) may be included by the server system 102 in the POV of party A if specifically allowed by rules input to the server system 102.

The server system 302 may implement backchannel conversations of a sequence 302 based on privacy rules and limitations such that it implicitly is not viewable (e.g. included in the POV of an individual) except for individuals of the group explicitly involved and those with administrative privilege to do so. Additionally, access to the interactions of a participant in a back channel regarding the parent conversation 300 or parent-sub-conversation may be restricted by the server system 102 by default. For example, in some embodiments no information regarding the original conversation is included in the POV of anyone added to the back-channel conversation. The method by which the back channel is created may be either for a user to find someone in a group or category of interest, or to seek out a conversation with one or more specific known individuals.

Interactions (which may include sub-interactions) may be identified by unique identifiers by the server system 102, may have a time duration and implicit subject matter, and may include messages from two or more participants. An interaction may be populated by the server system 102 with messages between the individuals included in the conversation 300 including the interaction. For example, an interaction may be a conversation as defined according to a conventional messaging protocol and include the messages of such a conventional conversation. Accordingly, the interaction may be stored as a data structure that corresponds to a traditional 1:1 chat, multi-user chat or group chat according to any mobile messaging protocol, instant messaging protocol, email, or some other messaging protocol. Participants in the interaction will be provided access by the server system 102 in the POVs thereof the text, audio, video or other application data transferred between an individual or group of party A, and the group on side B as part of the interaction. An interaction may also have associated therewith by the server system 102 a category or group, which corresponds to a group organizational structure or unit that pertains to the group of people who are responders to the external party regarding that category.

In some embodiments, the server system 102 may maintain a state or status for a sequence 302, the state describing the stage of processing which has been attached to the sequence. For a support ticket processing system, states may include open, pending, processing, closed, need information, or some other state. The state may be displayed with a representation of a sequence 302 in the POV of a user. In some embodiments, the state of a sequence 302 may be hidden from the POV of one or more users that include the sequence in the POV thereof. In some embodiments, tags mays also be attached to a sequence 302, where a tag is a user defined text element that describes what is happening. Categories may be pre-defined by a group and provided to the serer system 102. Categories may be selected from a collection of pre-defined categories and applied to a sequence by the server system 102 according to rules or received by the server system 102 from a user. Categories may be distinguishable from tags in that a tag may be any user defined value whereas a category must be selected from a limited set of values.

Creating a conversation, sequence and sub-conversation may proceed as follows:
a) The following activities may result in the creation of a conversation
   i) A conversation is created with one or more parties (including self) by the server system 102 either in response to an explicit instruction or upon detecting a message between parties that is not within the context of an existing conversation.
   ii) A conversation may be created by the server system 102 between a party and a group as defined above
   iii) A conversation may be created by the server system 102 between two groups as defined above.
b) In one implementation, different people in a group are enabled by logic implemented by the server system 102 to step in and out of having a direct conversation with an external party. This interaction may be contained in a sequence, which can be a time-based container, having a state.
   i) The sequence may include the following states: Open (it is active), Closed (if it is not active any longer), Responding (if the group is writing back), Typing (if the external party is typing), Pending (waiting for some other input from the group), Hidden (if not wanted anymore, or archived) or Timeout (waiting for some feedback from the external party).
c) The conversation may have rules regarding who is available for accepting conversations in a group.
d) A sequence may begin based on the following:
   i) Logic implemented by the server system 102 by which a subject of choice, categorical selection, or other semantic interpretation initiates a new sequence, such as when a first interaction is created for that sequence and when an interaction is initiated.
e) The primary party of a sequence may be recorded by the server system 102 as the party who initiates it. This may be considered to be the group, or system, and the primary party may be assigned that role by the system.
f) The primary person in a sequence may change the state of the sequence. In a group setting, an individual must have been granted the privileges or role to alter the sequence state in some embodiments.
g) Multiple sequences in a conversation may be in an open state at the same time, meaning multiple sequences of conversations may be active at the same time.
h) The server system 102 or interface on a device 106, 108 may filter the interactions of a sequence that are displayed or the order the interactions in one or more dimensions, such as time, participants, semantic content, tags, or categories applied or selected. A default or primary view may be ordered or segregated by temporal order and by participants.
i) A sequence need not end. However, if a sequence ends, the conversation may still remain in the POV between the group and the external party. A sequence may end based on the following:
   i) Given some configurable lapse of time
   ii) When one party indicates that it is done
j) An interaction is defined as communication between one or more parties. When a sequence begins, if no interaction exists, then one may be created by the server system 102. In most cases, this initial interaction will be the base upon which the rest of the communications occur. It may be created in the following circumstance:
   i) In one implementation, an interaction is created by the server system 102 when another party joins or accepts the conversation request from an external party
   ii) Each interaction may be stored within a sequence by the server system 102
   iii) An interaction may also be created by the server system 102 when one party instructs the server system 102 to add another party to an interaction
   iv) An interaction may be created by the server system 102 based on a subject matter, such as a ticket, event or topic according to programming of the server system 102.
   v) A user may instruct the server system 102 to create a self-interaction, such as for taking notes, or just as a base for initiating further interactions
k) Any party already added to the initial conversation in a sequence may be enabled by the server system 102 to actively create sub-interactions, either directly with other group representatives, friends, or via group aliases, e.g. categories.

FIG. 3 illustrates an example method by which a sequence 302 and interactions of a conversation 300 may be generated. For purposes of the following discussion, actions taken by or for a party may be understood as actions taken by or with respect to a device associated with that party. Alternatively, actions taken by or for a party may be understood as actions taken with respect to account data associated with a user identifier with which a party is associated with by the server system 102. The account data may then be accessed by that party by means of any of the devices disclosed above with respect to FIG. 1 and having some or all of the attributes of the computing device 200.

At step 304 party A connects to party B. Step 304 may include an initial message from party A to a group (e.g. company or group within a company) including party B or directly addressed to party B or vice versa (from B to A). The initial message may be generated by party A in the context of the conversation 300 and sequence 302 if these data structures already exist. Generating a message in the context of a conversation 300 and sequence 302 may include generating a message in an interface that is currently presenting a POV to the conversation 300 and sequence 302 one a user device 106, 108 or by generating a message for which an association to the conversation 300 and sequence 302 is explicitly made by a user by inputting identifiers to these data constructs or otherwise selecting them from a list of available data constructs.

As a result of the connection, interactions 306 between party A and party B may be generated that each include one or more messages 308 from A to B, responses 310 from B to A, messages from A to B, and so on. As noted above, each interaction according to the methods described herein may itself be include conversation as defined according to some other p2p protocol, such as an SMS, MMS, or EMS conversation, an instant messaging conversation, or some other conversation. The data defining these p2p conversations may be stored by the server system 102 as the interaction 306 and may be updated as messages are sent and received. A category may be associated with the interaction 306 by one or more of the participants; in this case the category selected was category A.

The sequence 302 may further be extended by generating other interactions. For example, at step 312 a new back-channel interaction between A and B is generated by the server system 102 responsive to an instruction from party A or B. Subsequent interactions between A and B in the context of this backchannel will be associated by the server system 102 with this backchannel and excluded by the server system 102 from the POV of other participants in the sequence 302 and conversation 300 in accordance with the functionality associated with backchannel interactions as described herein. The interaction 314 may inherit the category of interaction 306 and therefore have category A associated therewith. Alternatively, a new category may be associated with the interaction 314 by one of the participants.

At step 320, party B may add party C to the backchannel interaction 314. This may be performed by party B sending a message to party C in the context of or referencing the backchannel interaction 314. Subsequent messages 324 form C to A or B, responses 326 from A or B, and other messages among the parties A, B, and C in the context of the backchannel interaction 322 may then be added to the interaction 322 by the server system 102. As for other backchannel interaction, the interactions 322 among A, B, and C may be excluded from the POV of other participants of the conversation 300 and sequence 302.

In some applications, party B may additionally initiate 328 a new interaction with party C. For example, a backchannel interaction 330 may be initiated including messages 332 from party B, responses 334 from party C, and/or other messages between parties B and C. The interaction 330 may have a category associated therewith by one of the participants—in this case, category B.

An interaction, such as backchannel interaction 330 may be modified as to the participants that one or both can have the interaction in their POV and can transmit and receive messages in the context of the interaction. For example, interaction 330 may be modified by party C at step 336 to add party D to the interaction 330, such as by sending a message by party C to party D. At step 338, party B is removed, such as by the server system 102 in response to an instruction from party A. Subsequent interactions 340 between C and D may then be associated with interaction 340 of parties C and D. Interaction 340 may be excluded from the POV of party B. The interaction 340 may then include messages 342, 344 between parties C and D. As for other interactions, a category may be associated with interaction 340, such as category C in this case.

FIG. 3 shows a sequence 302 or a conversation 300. Other sequences 302 may also be associated with the conversation 300 and may include interactions processed in the same manner as described above. In particular, the POV of a customer of the conversation 300 may not indicate any end or beginning or other distinction between sequences. Instead the conversation 300 may be presented as a single conversation. Alternatively, interactions may be viewed as separate sequences 302 by a customer, e.g. an external party.

Figure 4A:
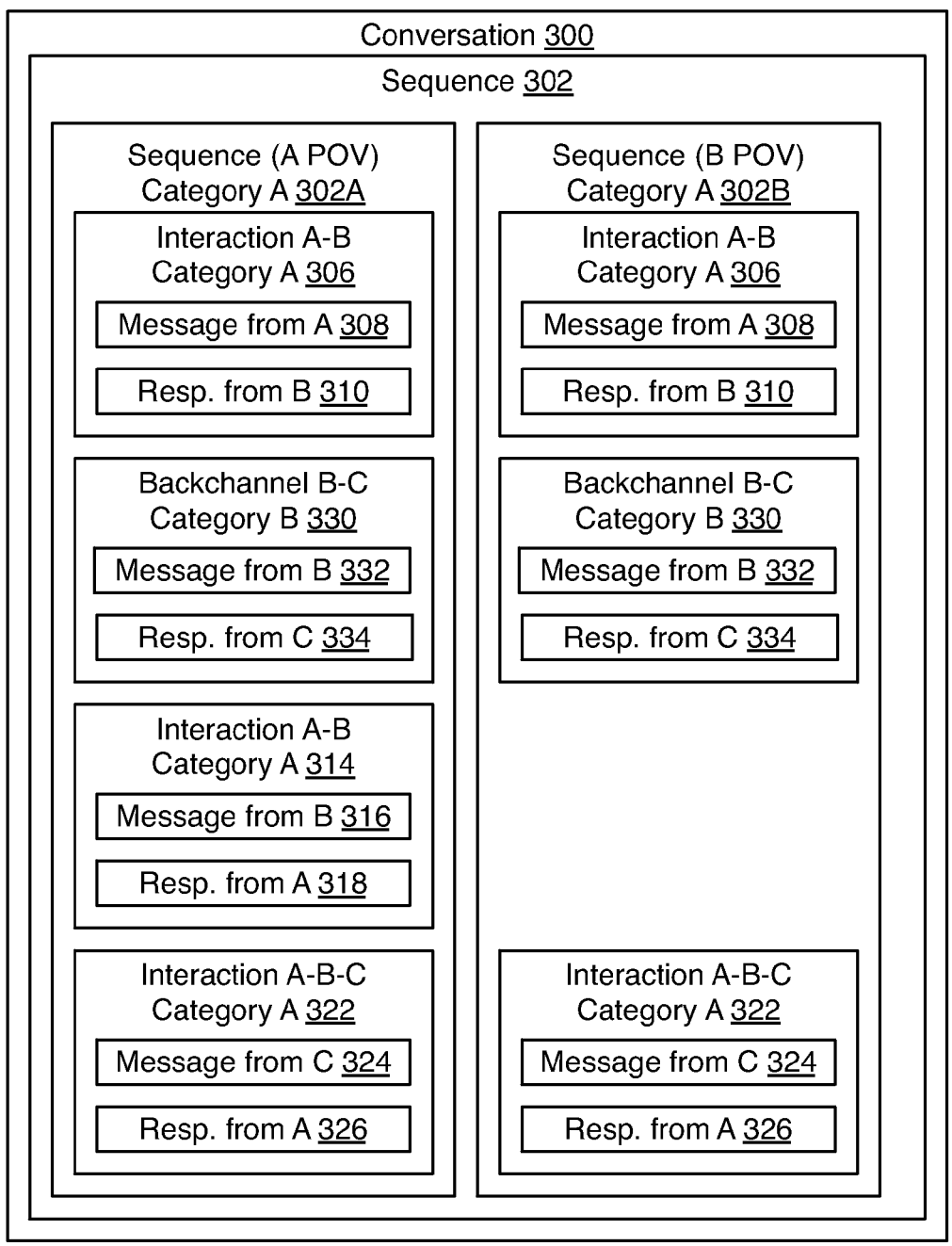
FIGS. 4A and 4B are schematic block diagrams of points of view of a conversation in accordance with an embodiment of the present invention.
Figure 4B:
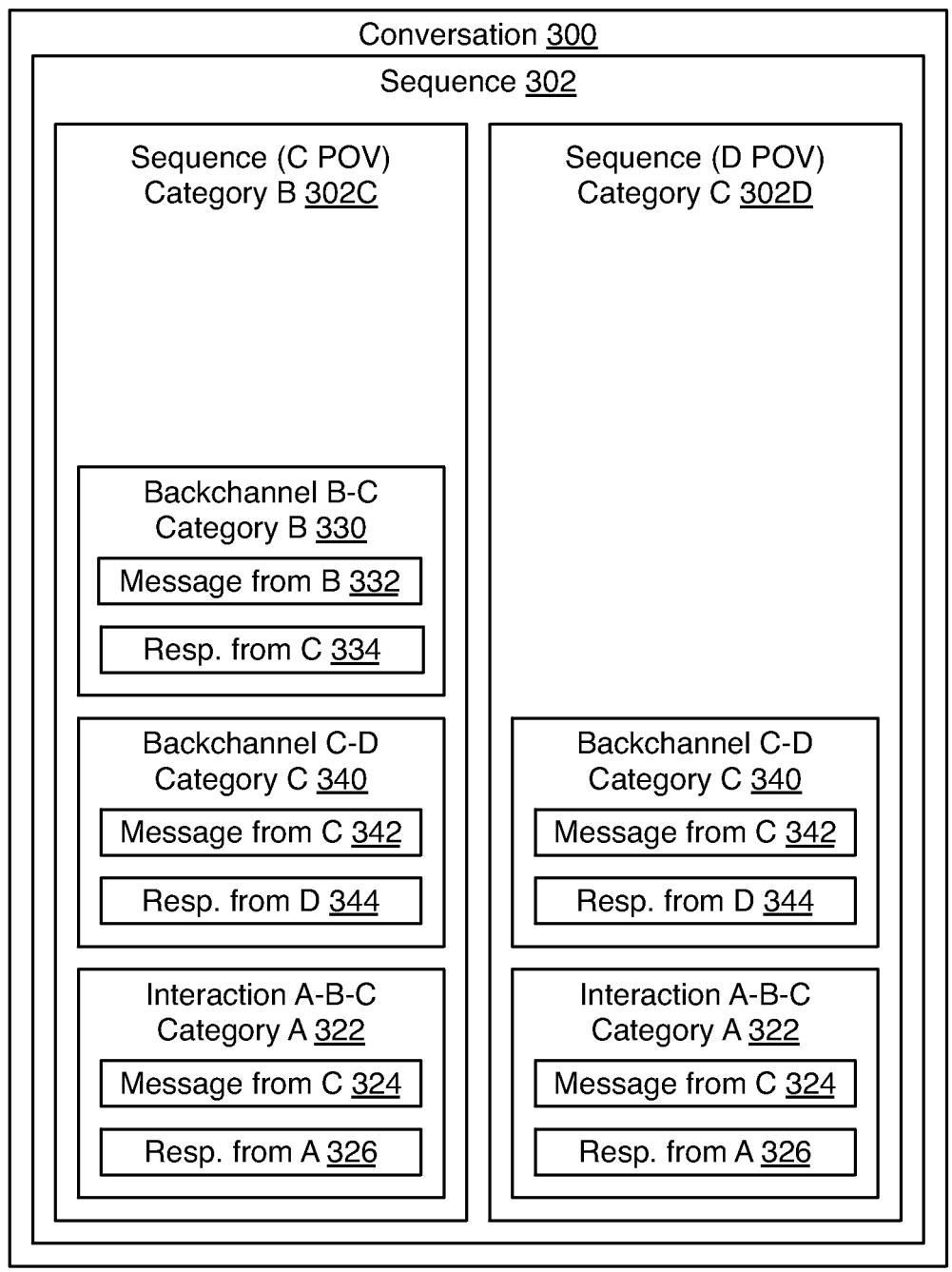

Referring to FIGS. 4A and 4B, the POVs for the parties of the conversation 300 of FIG. 3 may be as illustrated. For example, party A may be granted access by the server system 102 to POV 302A of the sequence 302 and be provided access to interactions 306, 314, 322, 330, 314 to which A was a party. In the illustrated embodiment, POV 302A may include access to interaction 330 of parties B and C due to party A being an administrator or otherwise granted access to interaction 330. The interactions 306, 314, 322, and 330 may be presented to party A in an interface on a device 106, 108 using data received from the server system 102 regarding the interactions 306, 314, 322, 330. Likewise, a user may interface with the server system 102 in order to view, sort, filter, edit, or take other actions with respect to records of the interactions 306, 314, 322, 330.

In a like manner party B may view and interact with POV 302B including interactions 306, 322, 330; party C may view and interact with POV 302C including interactions 322, 330, 340; and party D may view and interact with POV 302D including interactions 322, 340.

Figure 5:
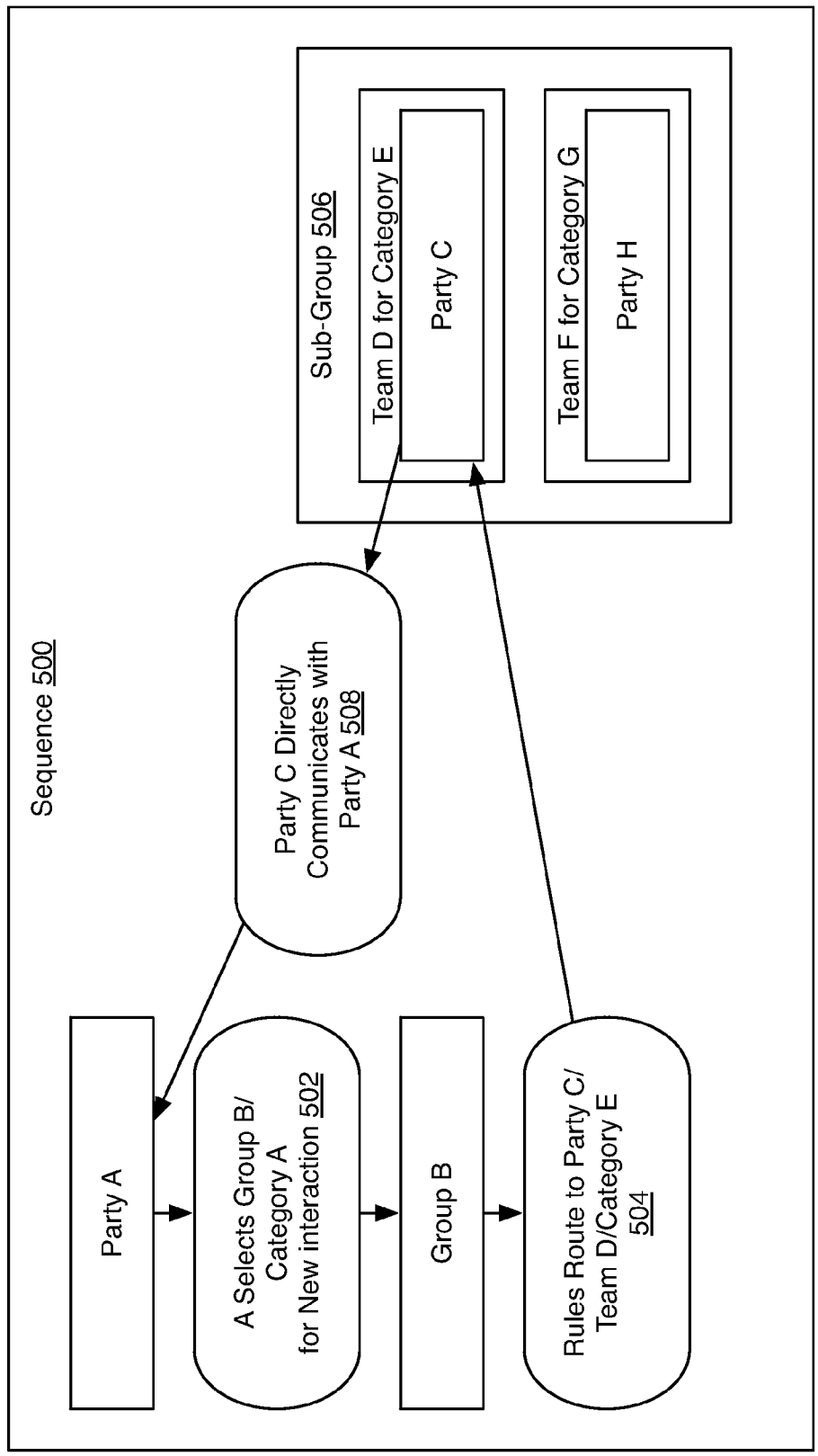
FIG. 5 is a process flow diagram of a method for routing interactions of a sequence in accordance with an embodiment of the present invention.

FIG. 5 illustrates a method whereby an external party may communicate with an individual of a group. Party A may invoke a server system 102 to create a sequence 500 by initiating communication with the server system 102, such as through a web interface or by transmitting a message to the server system 102, or otherwise detected by the server system 102, according to any of the messaging protocols described herein. Sequence 500 may be part of an existing conversation 300 or a conversation may be instantiated by the server system 102 along with instantiation of the conversation 300. In response to the communication from party A, the server system 102 may select a group and/or category to associate with the interaction with party A. For example, at step 502, the server system 102 selects group B and category A for the new interaction (or the new sequence, conversation, and interaction where these constructs were not created previously). At step 504, the server system 102 evaluates routing rules and determines a sub-group and/or individual to whom to route the interaction. In the example case, party C of team D, category E, and sub-group 506 is selected at step 504. Communication from party A, such as the initial communication, may then routed to party C. At step 508, party C conducts an interaction with party A. As described above, interactions may be the exchange of messages over any messaging protocol and such interactions may be recorded by the server system 102 and associated with the interaction, sequence, and context within the context of which the messages are transmitted.

Figure 6:
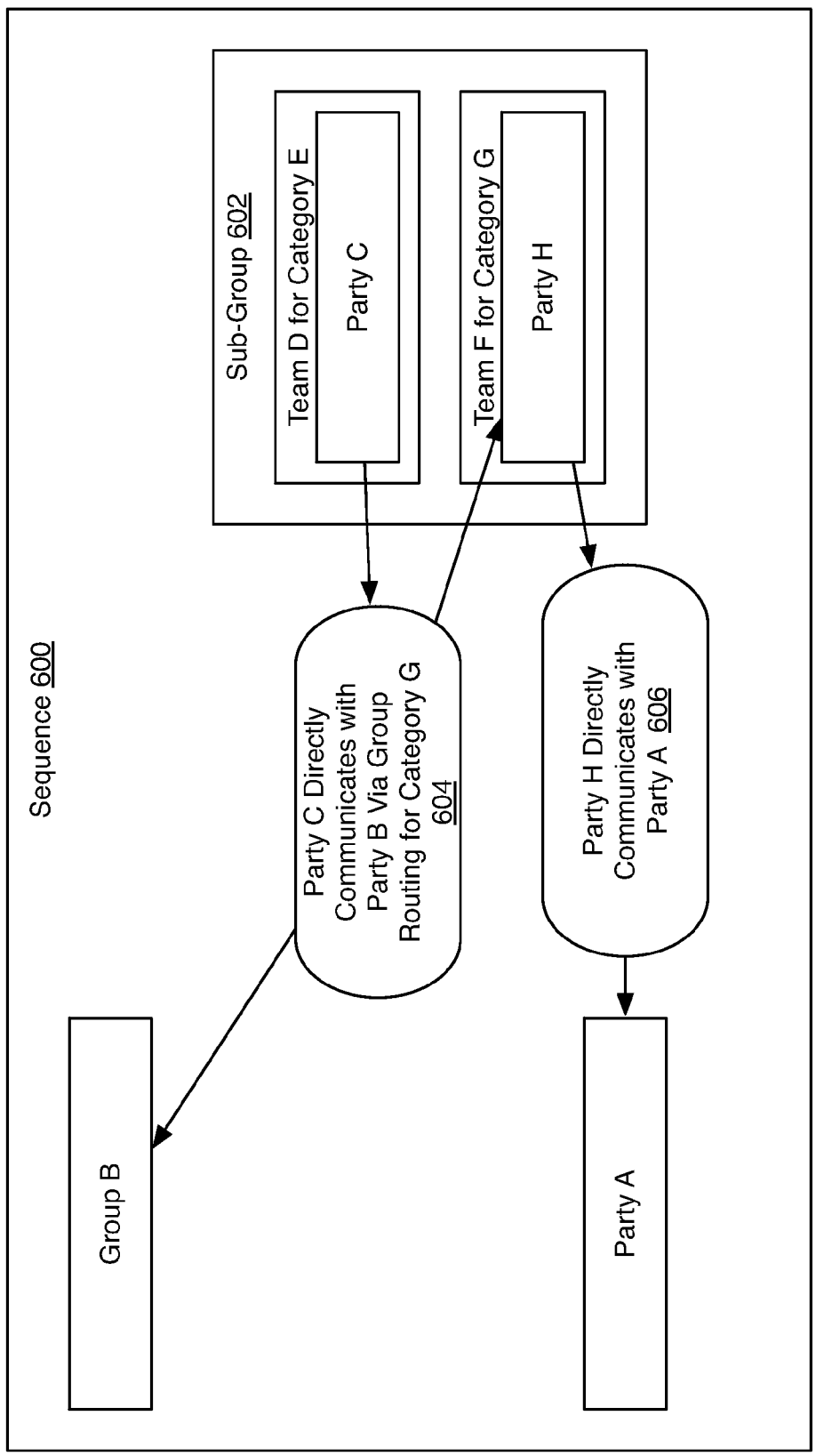
FIG. 6 is a process flow diagram of another method for routing interactions of a sequence in accordance with an embodiment of the present invention.

FIG. 6 illustrates another example sequence illustrating the internal routing of responsibility for communication with an external entity. For example, at step 602, a communication with party B is determined by server system 102, according to routing rules, to be assigned to party C, of team D, category E, and subgroup 602. The server system 102 may subsequently route interactions from group B to party C and vice versa, such as messages referencing or otherwise occurring in the context of the sequence 600.

In another example, an individual, party H, may simply initiate communication with external party A by way of server system 102 or some other direct routing, as part of the same sequence 600. At step 606 party H exchanges messages with party H as party of an interaction within sequence 600, these interactions being added to sequence 600 by the server system 102.

Figure 7:
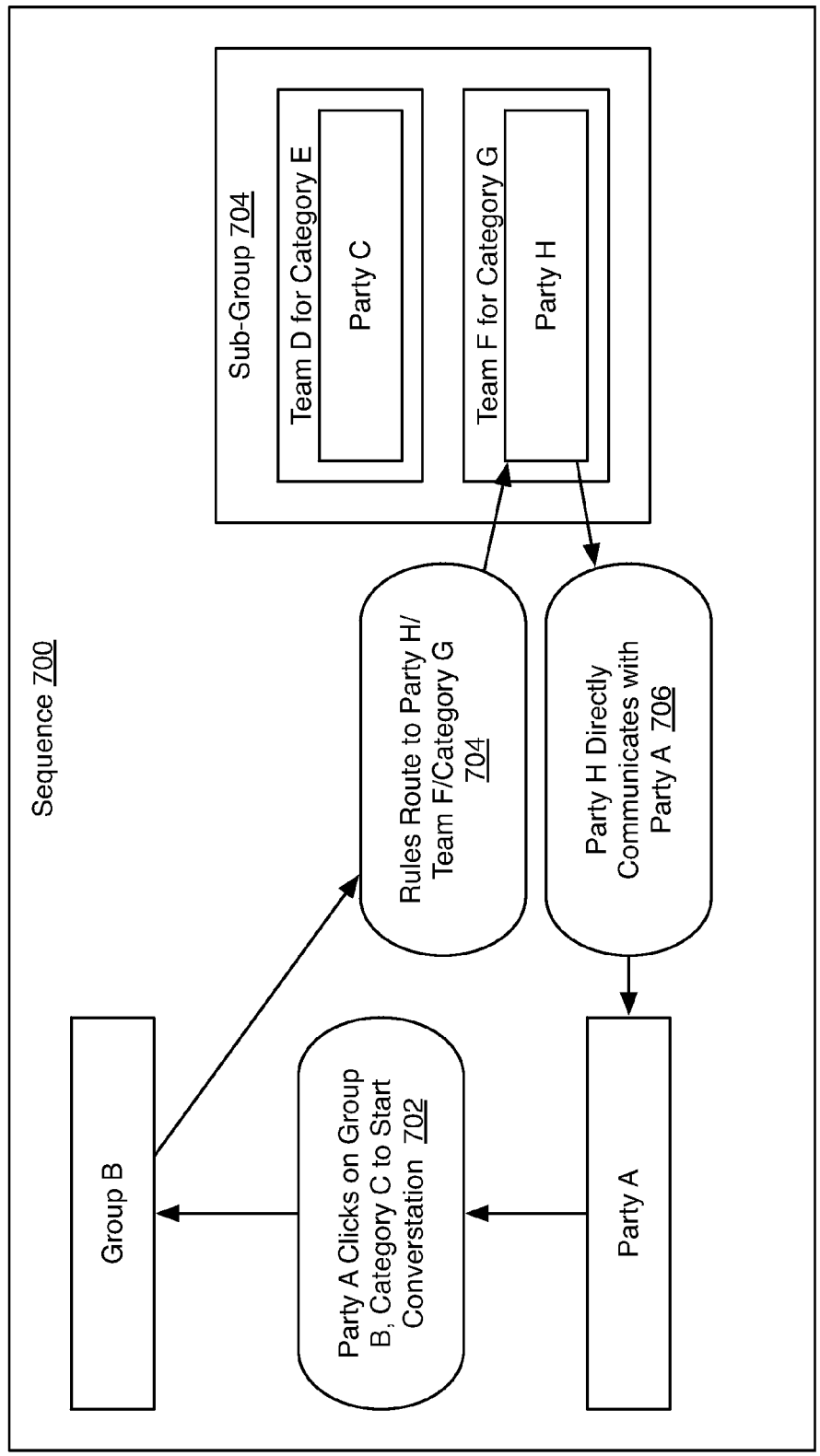
FIG. 7 is a process flow diagram of yet another a method for routing interactions of a sequence in accordance with an embodiment of the present invention.

FIG. 7 illustrates another example sequence illustrating the routing of communication with an external entity. For example a sequence 700 may be initiated at step 702 by party A selecting some or all of party A, group B, and category C to start a conversation, such as on a web interface to the server system 102. In response, at step 704 that server system 102 routes the request of party A according to routing rules to party H of team F, for category G and subgroup 704, for example. Party H then communicates directly with party A at step 706 either using contact information provided by the server system 102 or by way of the server system 102 as an intermediary.

Figure 8:
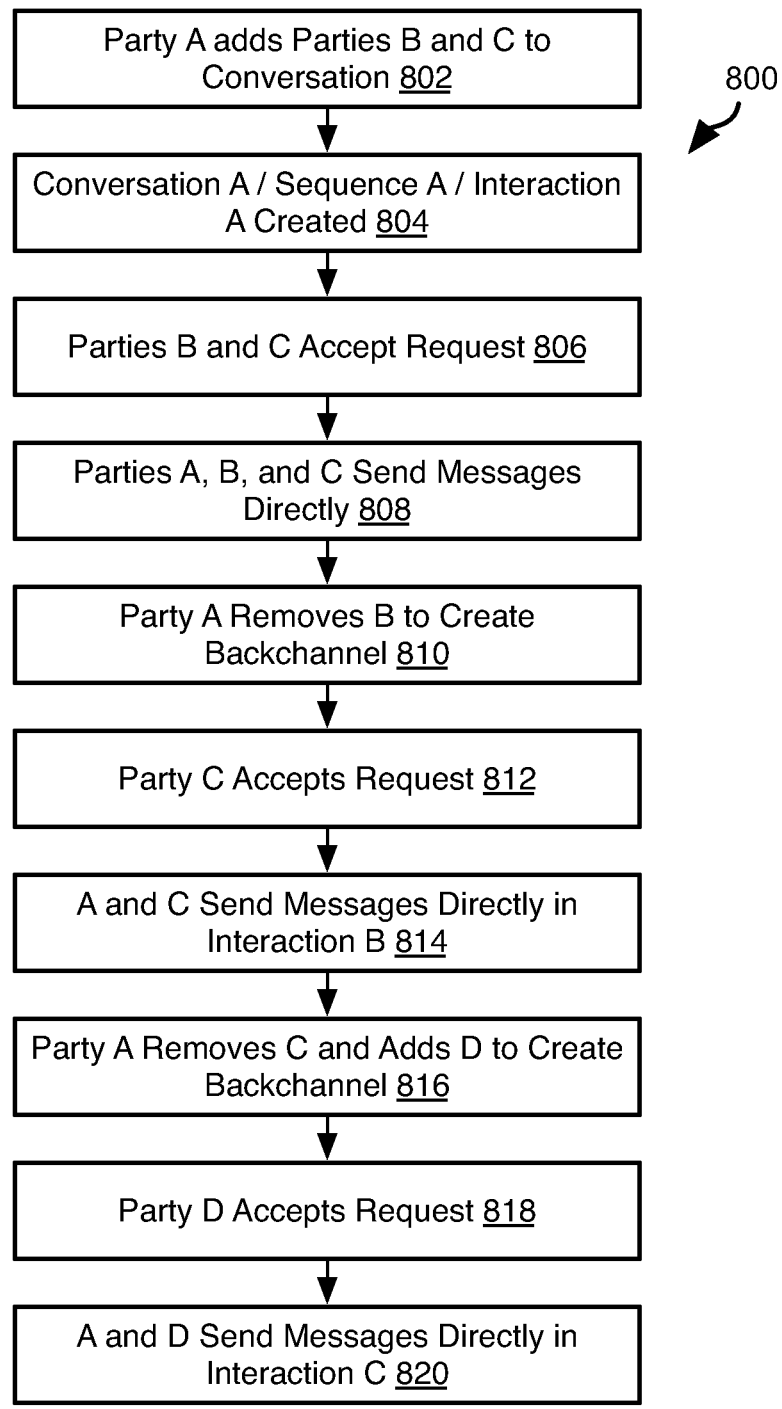
FIG. 8 is a process flow diagram of a method for conducting a conversation in accordance with an embodiment of the present invention.

FIG. 8 illustrates an example method 800 that may be performed in accordance with an embodiment of the invention. The method 800 may be executed by a server system 102 responsive to interactions with an interface to the server system 102 and messages transmitted by way of the server system 102 or reported to the server system 102 as relating to a conversation, sequence, and interaction defined according to the methods described herein.

The method 800 may include adding 802 parties B and C to a conversation. This may include party A selecting, on an interface to the server system 102 provided on a computing device 106, 108, interface elements corresponding to parties B and C in the context of a conversation or otherwise providing an indication on an interface on a computing device 106, 108 to add parties B and C to the conversation. A conversation, sequence, and interaction maybe created 804 in response to the instruction at step 802, conversation A, sequence A, and interaction A in the illustrated example.

At step 806, parties B and C accept requests. For example, upon receiving the instruction to add parties B and C at step 802, invitations may be transmitted by the server system 102 to user B and C, either by transmitting to devices associated with users B and C, associating the invitation with accounts associated with users B and C, or some other means. These invitations may then be presented on an interface of a device operated by users B and C, the interface being operable to receive an acceptance or rejection of the invitation and transmitting notification of the acceptance or rejection to the server system 102 or directly to party A.

After accepting the invitations, messages within the conversation may be sent 808 among the parties A, B, and C. As noted above, messages may be transmitted by way of any p2p protocol and may be sent by way of the server system 102 or reported to the server system 102, such as by a module presenting an interface on devices operated by parties A, B, and C that is operable to receive and transmit messages within a given conversation and transmit notification of the messages to the server system 102 for forwarding and/or recording in a record of the conversation.

In some embodiments, a user that invoked creation of the conversation (party A in this case) may further invoke creation of a sequence or interaction that excludes one or more parties in the conversation, a "backchannel interaction." For example an interface to the server system 102 may receive a selection of a party to include in the backchannel interaction or to exclude from the backchannel interaction. In the illustrated example, party A removes party B at step 810 to create a backchannel including parties A and C. In response, the server system may restrict access of party B and others from the backchannel interaction, i.e. not include it in the POV of those not party to the backchannel interaction.

Party C may accept the request 812 to participate in the backchannel interaction. For example, an invitation may be transmitted to party C and presented in an interface on a device of party C. The interface may receive acceptance or rejection of the invitation and transmit the acceptance to the server system 102 and/or party A. Parties A and C may then send messages to one another at step 814 in the context of the backchannel interaction in the same manner as for other methods described herein.

In the same manner as for steps 810-814 another backchannel may be created between party A and another party that excludes party C. For example, at step 816 party A removes party C and adds D to create another backchannel interaction; at step 818, party D accepts the request; and at step 820 A and D send messages directly to one another in the backchannel interaction.

Figure 9:
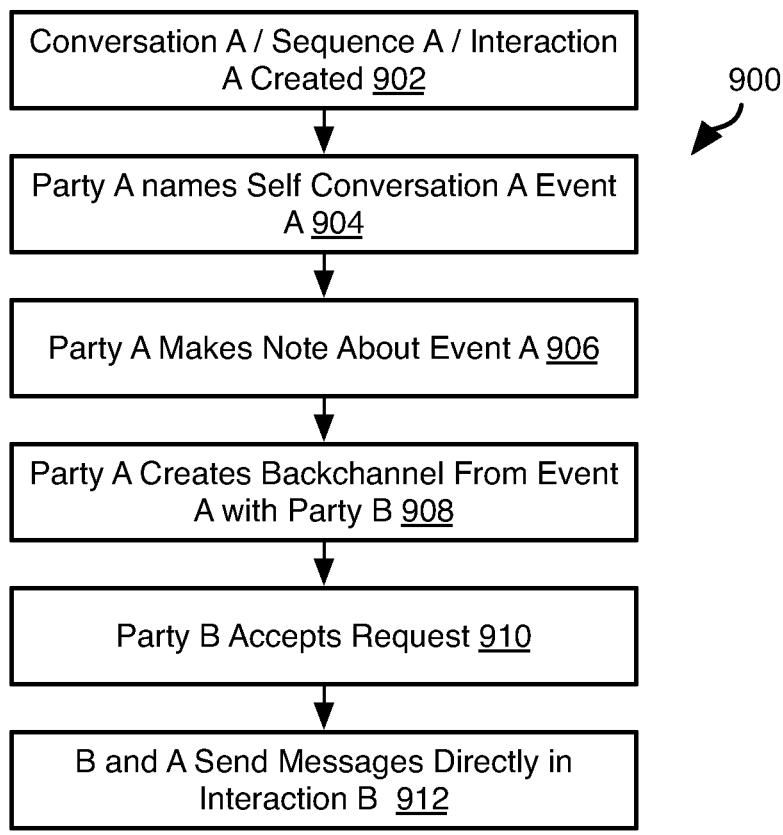
FIG. 9 is a process flow diagram of a method for creating backchannel interaction in accordance with an embodiment of the present invention.

FIG. 9 illustrates a method 900 by which a user (party A in this example) may invoke instantiation a conversation without first defining one or more other participants in the conversation. For example, at step 902 a server system 102 or other computer system creates a conversation and possibly a sequence and interaction responsive to an instruction received from a user. For example, conversation A, sequence A, and interaction A in the illustrated example.

The party that invoked creation 902 of the conversation may further instruct the server system 102 to name 904 that party as a participant in the conversation. This naming of the party as a participant may be recorded by the server system 102 as an event in conversation A created at step 902.

Party A may continue to generate events and add other data to conversation A without adding other participants. For example, at step 906 party A may provide text, photos, video, or other data to the server system 102 with an instruction to make a note about the event and the server system 102 may add a corresponding record of the note with the provided data to conversation A.

Party A may invite other participants to join conversation A and conduct interactions within conversation A, such as according to the other methods described herein. For example, party A may instruct the server system 102 to create a back channel interaction with party B that is a child of event A. Party B may be requested to join the backchannel interaction and accept 910 the request in the same manner as for other methods described herein. Likewise, party A and party B may send 912 messages to one another within the backchannel interaction in the same manner as for other methods described herein.

Figure 10:
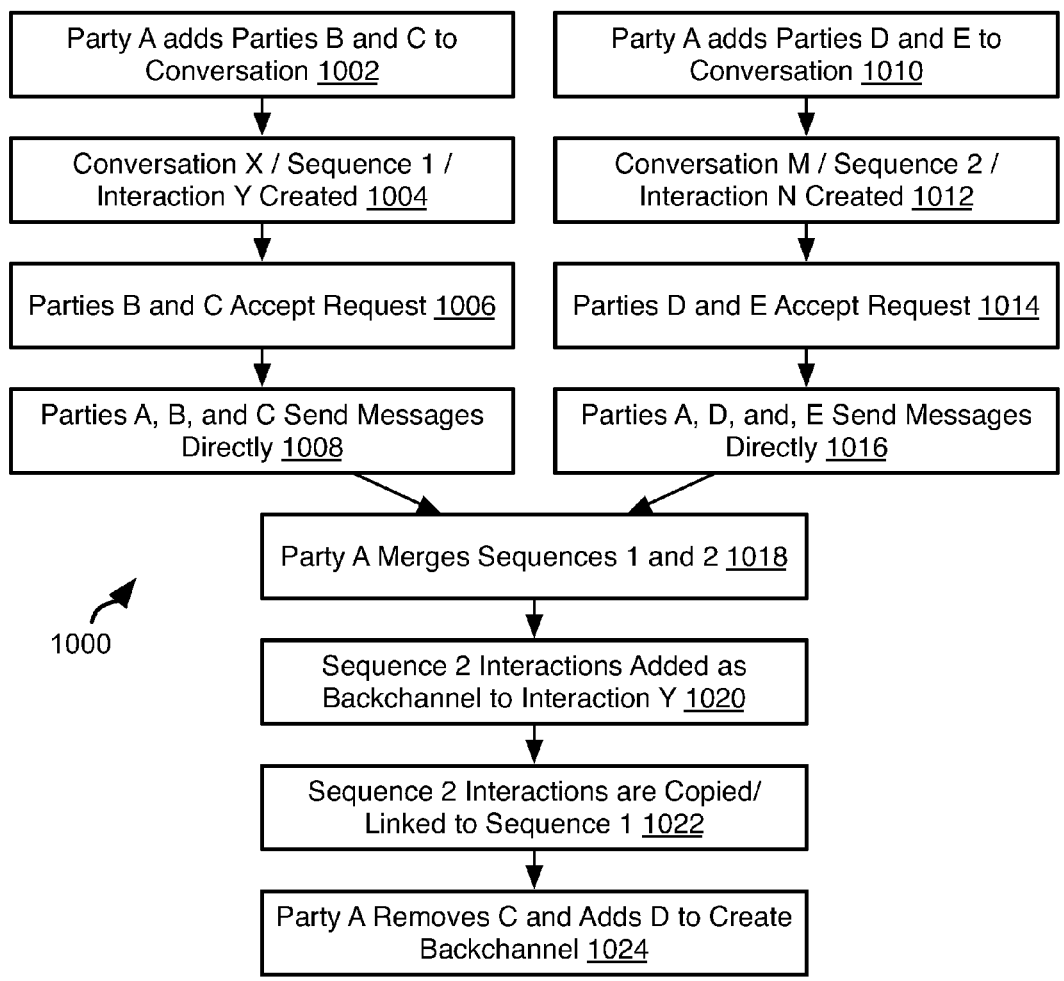
FIG. 10 is a process flow diagram of a method for merging sequences in accordance with an embodiment of the present invention.

FIG. 10 illustrates a method 1000 by which sequences of a conversation may be merged. For example, in the same manner as for other methods described herein, party A may add 1002 parties B and C to a conversation and a conversation, sequence, and interaction may be created 1004 as a container for interactions among parties A, B, and C. Where a conversation has already been created, a sequence and interaction may be created and associated with the existing conversation. In the illustrated method, conversation X, sequence 1, and interaction Y are created. The manner in which a conversation, sequence, and interaction are created may be in the same manner as for any of the other methods disclosed herein.

As for other methods disclosed herein, parties B and C may accept 1006 the request and parties A, B, and C may send 1008 messages directly to one another in the context of conversation X, sequence 1, and interaction Y.

In an identical manner, party A may add 1010 parties D and E to a conversation, such as to conversation X or to a different conversation. A corresponding conversation M, sequence 2, and interaction N may be created 1012 to contain messages among parties A, D, and E in the same manner as for other methods disclosed herein. Alternatively, sequence 2 and interaction N may be added to conversation X. Parties D and E may accept 1014 the request and messages may be sent 1016 among parties A, D, and E in the same manner as for other methods disclosed herein.

One or more conversations, sequences, or interactions may be merged as shown for steps 1018-1024. For example, some or all of the conversations X and M may be merged, sequences 1 and 2 may be merged, and interactions Y and N may be merged.

At step 1018, party A instructs the server system to merge sequences 1 and 2. For example, party A may provide an input to an interface to the server system 102 that indicates that sequences 1 and 2 should be merged, such as dragging an icon for sequence 1 over sequence 2 or vice versa. In response, the serve system 102 adds 1020 the interactions of sequence 2 to sequence 1, such as a backchannel interaction to interaction Y.

Sequence 2 interactions may further be copied 1022, linked, or otherwise added by the server system to sequence 1 such that the interactions of sequence 2 will be show in the POV of users as being part of sequence 2.

Party A may then take instruct the server system 102 to take any actions with respect to sequence 2. For example, party A may instruct the server system to remove party C and add party D to an interaction in order to create 1024 a backchannel in the same manner as for other methods described herein.

Figure 11:
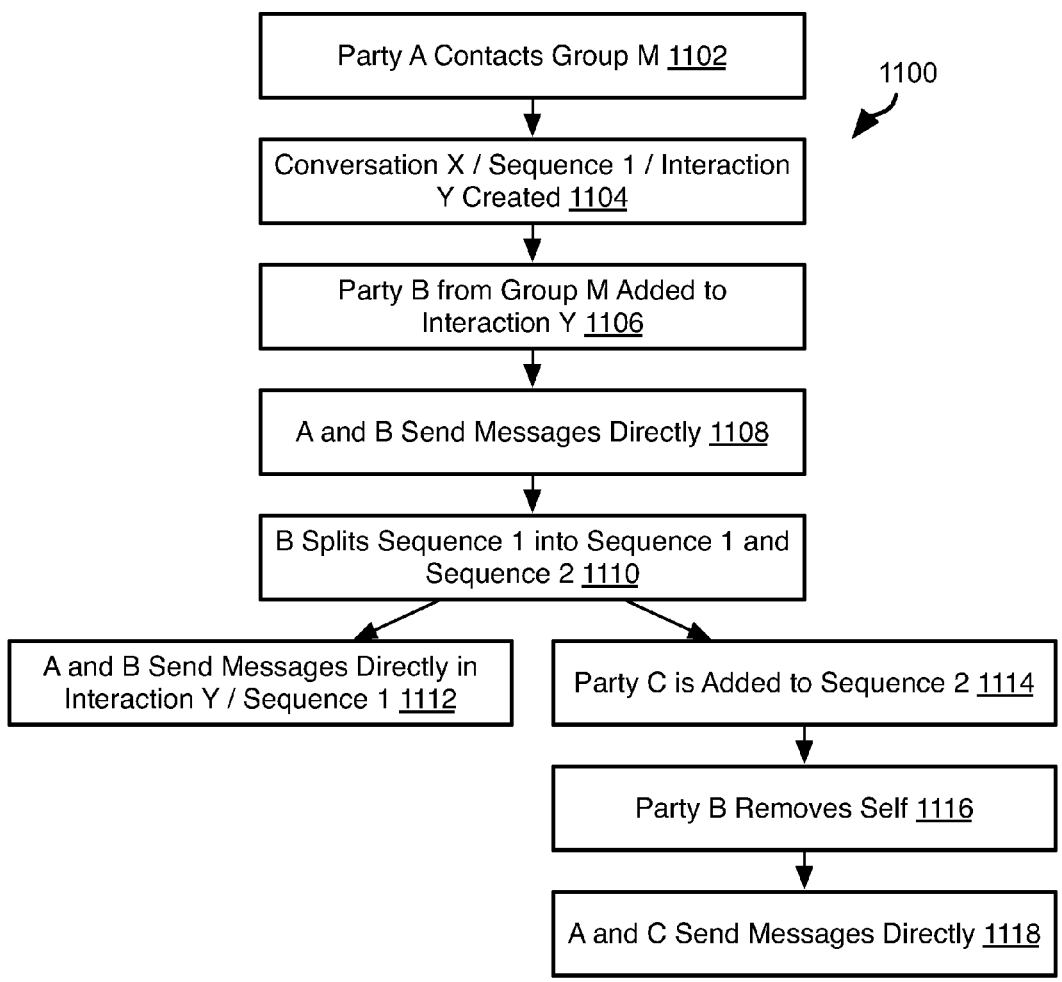
FIG. 11 is a process flow diagram of a method for splitting a sequence into two sequences in accordance with an embodiment of the present invention.

Referring to FIG. 11, a conversation, sequence, or interaction may be split into two conversations, sequences, or interactions according to the illustrated method 1100.

For example, in the same manner as for other methods disclosed herein a conversation, one or more sequences, and one or more interactions may be generated for one or more parties according to the methods described herein. For example, party A may contact 1102 group M and conversation X, sequence 1, and interaction Y may be created 1104. One or more parties from group M may be added to the conversation, such as party B from group M being added to interaction Y at step 1106 in the same manner as for other methods described herein. Parties A and B may send 1108 messages to one another within interaction Y in the same manner as for other methods disclosed herein.

Party B may instruct the server system 102 to split sequence into two sequences, such as by providing such an instruction to an interface to the serve 102 presented on a device 106, 108. In response, the server system 102 creates two sequence instances for sequences 1 and 2. The participants in the original sequence 1 may be maintained by the server system as participants of the sequences 1 and 2. Accordingly, these users may continue to send messages in the context of either sequence 1 or 2 in the same manner for interactions belonging to a sequence according to the other methods described herein.

The participants in the sequences 1 and 2 following splitting may be independently changed. In particular participants may be added or removed from either sequence independently. The process of adding or removing a participant to the sequences 1 and 2 may be performed in the same manner as for other methods described herein. For example, party C may be added 1114 to sequence 2, party B may remove 1116 him/herself from the sequence, and A and C may then send 1118 messages to one another within sequence 2 in the same manner as for any of the other methods described herein.

Figure 12:
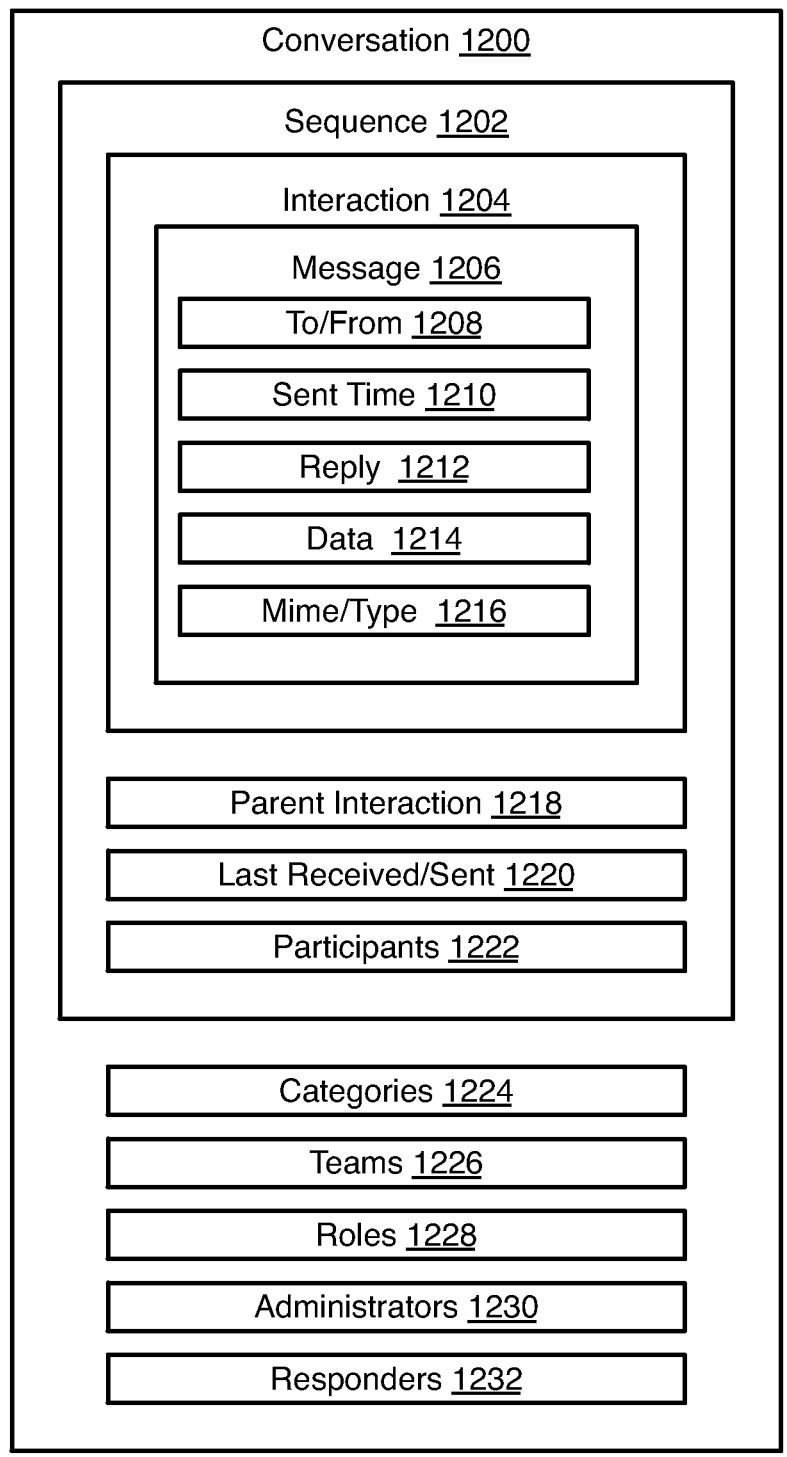
FIG. 12 is a schematic block diagram of data structures of a conversation in accordance with an embodiment of the present invention.

FIG. 12 illustrates the data that may be used to constitute a conversation as created, modified, and reported by the server system 102. For example, a conversation 1200 may include one or more sequences 1202 that each include zero or more interactions 1204. Each interaction 1204 may include zero or more messages 1206. A message may have the format and routing data according to any p2p protocol. For example, a message 1206 may include a to/from fields 1208 that include user identifiers or addresses for the sender or receiver of the message. The message 1206 may include a time field 1210 indicating when the message was sent by the sender. A message 1206 may include a reply 1212 thereto or a reference to a reply message to the message 1206. The message data 1214 may include payload data including text, video, audio, image, and other data that was communicated by the message 1206 or references to such information. A MIME (multipurpose internet mail extension) or type field 1216 that indicates the type of file for the message 1206 or payload data of the message 1206.

An interaction 1204 may further include a reference to a parent interaction 1218. For example, a user may create a new interaction, such as a backchannel interaction from an existing interaction. Accordingly, the server system 102 may include in the parent interaction field 1218 of the new interaction a reference to the existing interaction.

A sequence 1202 may further include a last received or sent field 1220 that includes a reference to the last message 1206 that was sent or received in the interaction 1206. The server system 102 may store in the participants field 1222 of a sequence 1202 user identifiers of participants of the interaction 1204.

A conversation 1200 may additionally define one or more of categories 1224 that are available to be associated with an interaction 1204 or sequence 1202 that are in the conversation 1200. A teams field 1226 may include a list of identifiers for teams that are authorized to participate in the conversation 1200.

A roles field 1228 may define one or more roles associated with the conversation. For example, the roles field 1228 indicate user identifiers of users along with a role in the conversation 1200 performed by each user. An administrators field 1230 may store user identifiers for those users having administrative privileges as defined hereinabove. A responders field 1232 may define routing rules for external inquiries that are received by the conversation 1200, e.g. to which user identifier an external inquiry may be addressed that is assigned to the conversation 1200.

Figure 13:
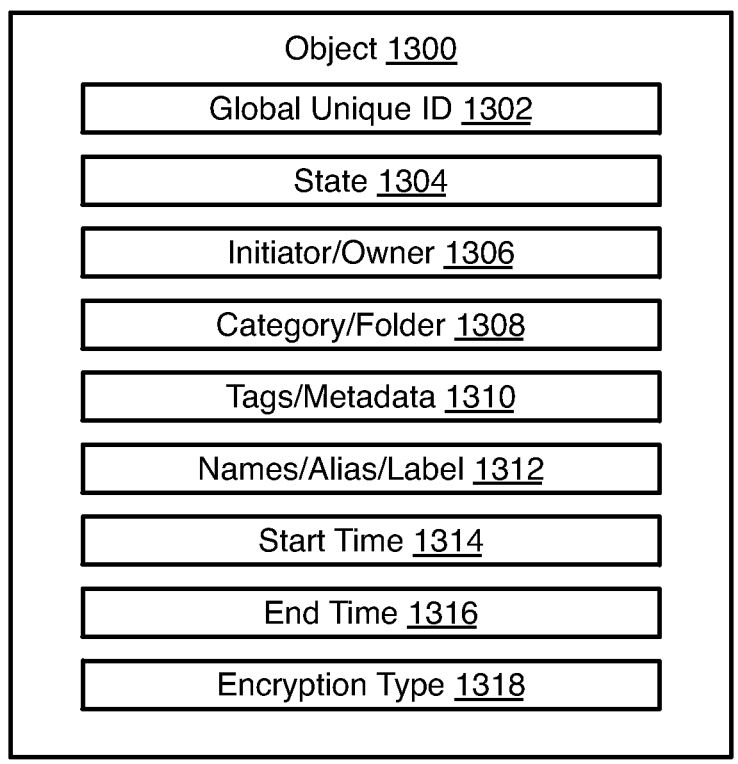
FIG. 13 is schematic block diagram of data structures of an object used in a conversation in accordance with an embodiment of the present invention.

Referring to FIG. 13, a conversation, sequence, interaction, or message may be stored by the server system 102 as an object that is accessed and updated according to the methods described herein. For example, an object 1300 may include a global unique identifier 1302 used by the server system 102 to address the object 1300. A state 1304 may indicate a state of the object such as active if messages may currently be exchanged for that object or inactive if messages are not permitted to be associated with the object.

An object 1300 may also have a category or folder 1308 associated therewith as well as one or more tags 1310 or other metadata. Tags and categories may be associated with an object in the manner described hereinabove. In some embodiments, an object may have one or more names, aliases, or labels 1312 associated therewith.

An object 1300 may have a start time 1314 and end time 1316 associated therewith. The start and end times 1314, 1316 may indicate a life for the object 1300 after which the object 1300 is no longer used to store messages in accordance with the methods described herein.

An object 1300 may be encrypted when shared between devices and may define an encryption type 1318 used to perform such encryption. The encryption type maybe any encryption type known in the art.

Figure 14:
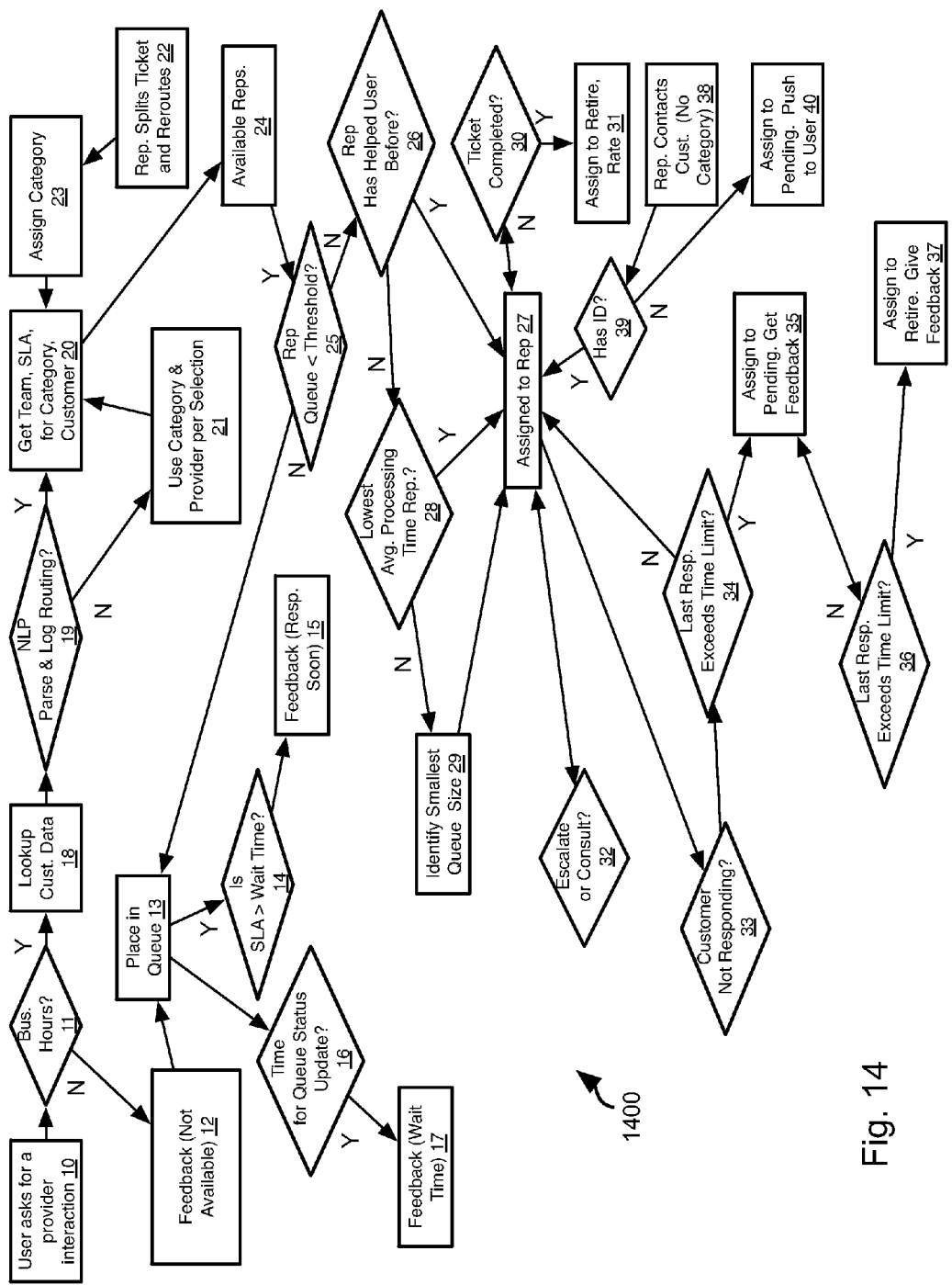
FIG. 14 is a process flow diagram of a method for routing interactions in accordance with an embodiment of the present invention.

FIG. 14 illustrates a method 1400 that may be used to route interactions in the form of calls, instant messaging sessions, emails, or any other type of P2P interaction. In particular, the method 1400 may implement routing rules references hereinabove for routing messages of a conversation. The method 400 may be executed by the server system 102.

At step 10 a user asks an entity for an interaction (hereinafter the "request") such as by clicking a link on a web site hosted by the server system 102 or transmission a message to the server system 102 by any P2P protocol. At step 11 the server system 102 determined whether the request is received during business hours. If not, at step 12 then feedback may be transmitted to the user, such as a message by any protocol indicating that no one is available to respond to the request. An entry may be placed 13 in a queue referencing the request with sufficient information to respond later, such as a user name, account number, phone number, or other addressing information.

The queue may be managed to ensure a given level of service. For example, at step 14 a required response time as specified in a service level agreement (SLA) may be compared to an amount of time that an entry has been in a queue without being responded to. If at step 14, this time is found to have been exceeded, then at step 15 feedback may be provided, such as a message indicating that a response will be provided shortly. In either case, during the time that a message is in the queue an amount of time since the last queue status update was provided to the user may be evaluated at step 16. If it is found to exceed a status update time, then feedback may be provide at step 17, e.g. a message indicating that a response to the request is pending.

If, at step 11, the request is found to have been received during business hours, then the subsequent steps of the method 1400 may be executed. In some embodiments, some or all of the steps of the method 1400 may be executed with respect to requests added to the queue at step 13.

At step 18, customer information is looked up, such as from a database accessible by the server system 102. The account or database entry used to obtain this information may be identified from information provided in the request, a user identifier, account number, phone number, or other address used by any messaging protocol. The data retrieved may include information describing a user's relationship with the provider such as an account number, geographical location of the user, tier of service contracted for, spending history, and the like.

At step 19, content of the request may be processed such as by performing natural language processing (NLP) to determine the subject matter of the request, e.g. a category, department, account, product, or some other concept or entity. If at step 19 it is found that the request can be routed, then at step 20 some or all of a team, service level agreement, and category may be identified for the request. Other information, the time before pending (e.g. before a request is selected from a queue and responded to by a representative), time before close (e.g. a request is retired as being completed or otherwise no longer active), and category queue size for the team (e.g. a number of requests in a queue for the team and assigned to the category assigned to the request). If at step 18, this information is not found to be obtainable from the request, then at step 21 user selected values for a category and/or a requested provider (e.g. department, team, or individual) provided in the request by the user may be used to select a respondent (department, team, or individual) to the request and/or classification of the request to a particular category. Processing may then continue at step 20.

In some instances, requests may be generated internally by an entity. For example, in response to a previous request by a customer, an individual may instruct the serer system 102 at step 22 to split a ticket (e.g. record) containing the status of the request to generate another request that is then routed according to the steps of the method 1400, such as by assigning 23 a category and continuing processing at step 20.

Following step 20, the method 1400 may include identifying at step 24 any available representatives for the team identified at step 20. For example, the server system 102 may maintain a queue for each representative indicating requests assigned to that representative. One or more available representatives may be selected in a round-robin fashion or some other load balancing approach or may be selected based on a size of the queue for the one or more representatives of a team, e.g. the representative having the fewest request in his/her queue may be selected. In some embodiment, step 24 may include identifying all representatives of team that are on duty or otherwise currently working on responding to requests or that are available to respond to requests if needed (e.g. on call or working remotely).

At step 25, the queues of the one or more available representative selected may be evaluated. For example, the number of requests in the queues may be compared to a threshold condition. Where the size of the available representatives' queues exceeds some threshold condition, e.g. a maximum number of requests or requests per available representative, then the request may be placed 13 in a queue for subsequent assignment o an individual representative. The queue at step 13 may be a team-specific queue, whereas requests that have not yet been assigned to a particular team may be assigned to the same or a different queue.

If the size of the available representatives' queue is not found to exceed the threshold condition at step 26, then the method 1400 may include evaluating at step 26 whether one of the available representatives has previously responded to requests from the user (the user at step 10). If so, then the request is assigned 27 to the selected representative, e.g. added to the queue of the selected representative. If not, the method 1400 may include identifying a representative from among the available representatives based on one or more criteria. For example, at step 28, if the representative with the lowest average processing time is available, e.g. is not currently responding to a request or has queue below some threshold, then the request is assigned 27 to that representative. Otherwise, the available representative with the smallest queue may be identified at step 29 and the request assigned 27 to that representative. Alternatively, a representative may be identified at step 29 according to any load balancing or task assignment method.

Once assigned to a representative, the progress of a request may be periodically evaluated or other actions may be taken with respect to the request. For example, if at step 30, the request (e.g. a ticket used to track progress of the request by the server system 102) is found to have been completed, then at step 31, it is assigned 31 to be retired (e.g. flagged as completed or inactive) and a request is generated for the user to rate a response to the representative's handling of the request. The user's rating may be obtained and stored in association with the retired request according to any method known in the art. If when checked at step 30, the request is not found to have been completed, the request may remain assigned to the representative selected as described above.

In another example, if a request is found 32 to require escalation to a supervisor or require consultation with a specialist, then the request may be assigned 27 to the supervisor or specialist determined at step 32. If not, then the request may remain assigned to the representative to which it was originally assigned.

In another example, if the user is found 33 not to be responding to messages from the assigned representative, then one or more actions may be taken. For example, if a time since the last response form the user is found 34 to exceed some predetermined time limit, then at step 35 the request may be flagged as pending and feedback may be provided to the user, i.e. a message indicating that a response is expected ("We noticed you went away?"). Periodically, the time since the last response of the user may again be evaluated 36 to determine whether the time since the last response exceeds some time limit, which may be larger than the time limit at step 34, e.g. between two and ten times longer than the time threshold at step 34. If this time limit is not found to have been exceeded, then step 35 may be repeated. Otherwise, the request may be retired 37 and feedback may be provided to the user, i.e. a message indicating that the request was being closed or closed for lack of a response from the user.

In some embodiments, requests handled by a representative may be initiated by the representative. For example, at step 38, a representative may contact a user, such as by invoking transmission of a message by the server system 102 to the user. The contact may not have a category associated therewith. At step 39, the server system 102 may evaluate whether the customer contacted has an identifier associated therewith, i.e. has a corresponding record stored or accessed by the server system. For example, the actual messages between the user and the representative that responds to the request may be by any peer-to-peer protocol. In particular, a messaging session may be implemented as a conventional chat where two or more users are placed in a conversation or room, and are subscribed to postings to each other. For example, when A sends a message B receives it, and when B sends a message A receives it. Accordingly, a "pipe" or "the conduit" may exist between the two parties. In any such system, an identifier may be defined each user, and potentially also the conversation they are engaged in. So if we the pipe is not being provided directly by the server system 102 or event if it is, an identifier may be provided to the parties, as well as the API (application programming interface) that will send the messages to the appropriate service that will then use those identifiers to route messages to the appropriate parties within the chat session between the parties. Accordingly, step 39 may include determining whether the user has such an identifier.

If at step 39, the user is found to have such an identifier, then a request may be created and added 27 to the queue of the representative, the request referencing the identifier determined to exist step 39. If the user contacted does not have an identifier, then the contact may be flagged as pending and pushed to the user.

Figure 15:
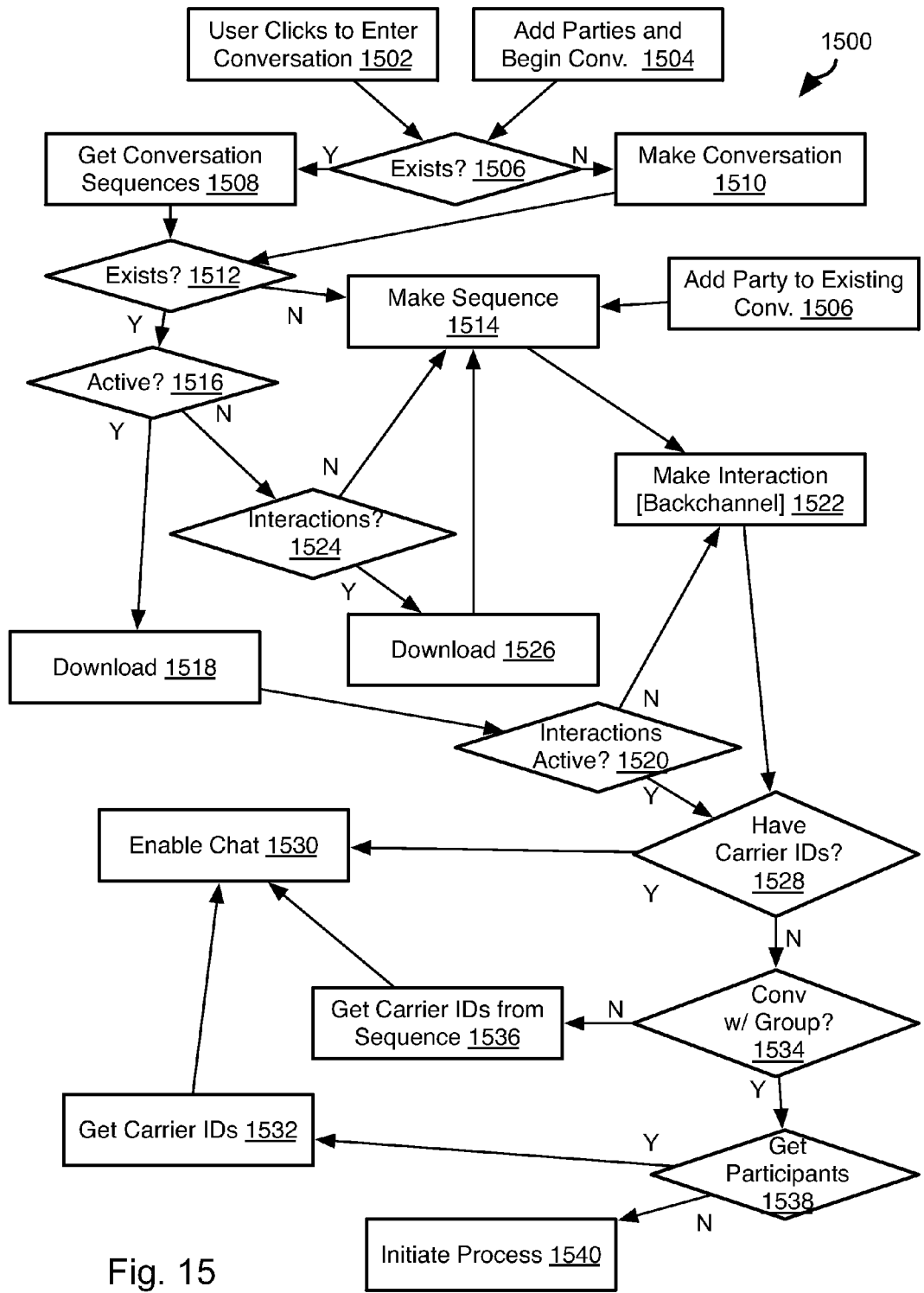
FIG. 15 is a process flow diagram of a method for initiating a conversation in accordance with an embodiment of the present invention.

FIG. 15 illustrates a method 1500 that may be used to initiate conversations as defined herein and/or add parties to a conversation. The method 1500 may be executed by the server system 102.

The method 1500 may be invoked in multiple ways. For example, the method 1500 may be invoked upon receiving 1502 by the server system notification of a user clicking on a link or other interface element requesting an interaction or sending a message. The method 1500 may also be invoked upon receiving, by the server system 102, a request from the user to add parties to an existing conversation or a new conversation.

If a conversation is found 1506 to exist for the user, then any sequences for that conversation may be retrieved at step 1508. If a conversation is not found 1506 to exist for the user, then a conversation is created 1510, i.e. a conversation object as described hereinabove.

The method 1500 may further include determining at step 1512 whether any sequences exist for the conversation determined to exist at step 1506 or created at step 1510. If not, one is made at step 1514. If a sequence is found to exist at step 1512, then the sequence may be evaluated at step 1516 to determine whether it is active. If so, then at step 1518 some or all of the interactions, participants, MRU (most recently used) interaction, may be retrieved in reverse chronological order. The interactions of the downloaded sequence may be evaluated at step 1520 to determine whether they are active, and, if not, then an interaction may be created at step 1522, which may be a backchannel interaction as described above.

If the sequence is not found 1516 to be active, then at step 1524 the sequence may be evaluated to determine whether any old interactions occurred within the inactive sequence. If so, these may be downloaded at step 1526. Downloading 1526 may be performed in the background with respect to subsequent steps, i.e. the subsequent steps illustrated may be performed while step 1526 is ongoing. For example, processing may continue at step 1514 and step 1522 as described above.

After making an interaction at step 1522 or determining that a sequence has an active interaction at step 1522, the method 1500 may include evaluating at step 1528 whether some or all of the parties of the interaction have carrier identifiers, i.e. identifiers used to identify the participants in a chat session or other messaging session as described above with respect to step 39. For example, a session may be conducted over some other service other than one provided by the server system 102 (e.g. SKYPE, SMS Text, instant messaging, or the like). Accordingly, the carrier identifier may be an identifier for such a provider or usable according to a software developer kit (SDK) or other data interface to a service of such a provider. If so, then chatting between the user and other participants in the interaction (steps 1522, 1518) may be enabled 1530 and subsequent interactions among the participants may be associated with the interaction as described hereinabove.

If at step 1528, carrier identifiers are not found, then the method 1500 may include determining whether the conversation is with a group, as opposed to with just two participants. If not, then the carrier identifiers may be obtained from the sequence (steps 1512, 1514) at step 1536, and chat between the participants may be enabled 1530.

If the conversation is found 1534 to be with a group, then whether the participants of the conversation can be found is determined at step 1538. If so, then carrier identifiers may be obtained 1532 for the participants and chat enabled 1530. If at step 1538, participants cannot be retrieved, then at step 1540 a process may be initiated to add the request to a queue (e.g. placed on a queue according step 13 described above) for response at a later time as representatives become available, as described hereinabove. In particular, as a representative becomes available later, the request will then be routed to the representative as described above.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising, by a computer system:
   receiving a request for interaction by a first entity from a second entity;
   in response to the request for interaction, generating a conversation object and associating the request for interaction with the conversation object;
   routing the request for interaction to a first user of a plurality of first users associated with the first entity;

receiving first interactions at least one of among the plurality of first users associated with the first entity and between the second entity and the first user;

in response to receiving the first interactions, storing the first interactions in the conversation object;

storing, in the conversation object, user identifiers of a plurality of participants, the plurality of participants including the first user, the second entity, and one or more other users of the plurality of first users;

receiving a request to initiate a conversation from a participant associated with the conversation object;

in response to the request to initiate the conversation, retrieving carrier identifiers for the plurality of participants, the carrier identifiers being identifiers for a third-party carrier;

conducting a communication session among the participants using the third-party carrier using the carrier identifiers, the communication session including second interactions;

storing the second interactions in the conversation object; and providing to each first user of at least a portion of the plurality of first users, a representation of the conversation object including representations of any of the first interactions addressed to the each first user and at least a portion of the second interactions.

2. The method of claim 1, further comprising:
receiving an initial communication between two or more first users of the plurality of first users and associated with the conversation object;
defining a sequence object including the initial communication and one or more subsequent communications between the two or more first users, the sequence object being part of the conversation object.

3. The method of claim 2, further comprising:
associating a state with the sequence object; and
updating the state of the sequence object responsive to inputs from a user of the two or more first users.

4. The method of claim 3, wherein the state may have a value of open or closed.

5. The method of claim 4, wherein the state may further have a value of responding, pending, hidden, and timeout.

6. The method of claim 2, further comprising prohibiting access to the sequence object by any of the plurality of first users other than the two or more first users.

7. The method of claim 2, further comprising at least one of dividing the sequence object into two sequence objects and merging the sequence object with another sequence object.

8. The method of claim 1, further comprising defining a sub-interaction of a selected first interaction of the first interactions, the sub-interaction excluding from participants thereof a user of the plurality of first users that is a participant in the first interaction.

9. The method of claim 8, further comprising adding an additional first user from among the plurality of first users to the sub-interaction and associating interactions with the additional user to the sub-interaction, the additional user not being a participant in the selected first interaction.

10. The method of claim 1, further comprising:
receiving a first message from the second entity to the first entity and not addressed to a specific first user of the plurality of first users;
selecting a recipient from among the plurality of first users and transmitting the first message to the recipient;
storing the first message in the conversation object.

11. The method of claim 1, further comprising:
receiving a first message from the second entity to the first entity and not addressed to a specific first user of the plurality of first users;
selecting a recipient from among the plurality of first users and transmitting the first message to the recipient;
directing subsequent messages from the second entity to the recipient;
storing the first message and subsequent messages in the conversation object.

12. A system comprising one or more processors and one or more memory devices operably coupled to the one or more processors and storing executable and operational code effective to cause the one or more processors to:
define a conversation object with respect to a first entity and a second entity;
receive first interactions among a plurality of first users associated with the first entity, the first interactions not being transmitted to the second entity, the first interactions referencing the conversation object;
in response to receiving the first interactions, store the first interactions in the conversation object;
store, in the conversation object, user identifiers of a plurality of participants, the plurality of participants including the second entity, and one or more other users of the plurality of first users from whom first interactions were received;
receive a request to initiate a conversation from a participant associated with the conversation object;
in response to the request to initiate the conversation, retrieving carrier identifiers for the plurality of participants, the carrier identifiers being identifiers for a third-party carrier;
receive second interactions, the second interactions included in a communication session using the third-party carrier using the carrier identifiers for the plurality of participants;
storing the second interactions in the conversation object; and
provide to each first user of at least a portion of the plurality of a first user, a representation of the conversation object including representations of any of the first interactions addressed to the each first user and at least a portion of the second interactions.

13. The system of claim 12, wherein the executable and operational data are further effective to cause the one or more processors to:
receive an initial communication between two or more first users of the plurality of first users and associated with the conversation object;
define a sequence object including the initial communication and one or more subsequent communications between the two or more first users, the sequence object being part of the conversation object.

14. The system of claim 13, wherein the executable and operational data are further effective to cause the one or more processors to:
associate a state with the sequence object; and
update the state of the sequence object responsive to inputs from a user of the two or more first users.

15. The system of claim 14, wherein the state may have a value of open or closed.

16. The system of claim 14, wherein the state may further have a value of responding, pending, hidden, and timeout.

17. The system of claim 13, wherein the executable and operational data are further operable to cause the one or more processors to prohibit access to the sequence object by any of the plurality of first users other than the two or more first users.

18. The system of claim 13, wherein the executable and operational data are further operable to cause the one or more processors to at least one of divide the sequence object into two sequence objects and merge the sequence object with another sequence object.

19. The system of claim 12, wherein the executable and operational data are further operable to cause the one or more processors to define a sub-interaction of a second interaction of the second interactions, the sub-interaction excluding from participants thereof a user of the plurality of first users that is a participant in the second interaction.

20. The system of claim 12, wherein the executable and operational data are further operable to cause the one or more processors to:

receive a first message from the second entity to the first entity and not addressed to a specific first user of the plurality of first users;
select a recipient from among the plurality of first users and transmitting the first message to the recipient;
store the first message in the conversation object.

21. The system of claim 12, wherein the executable and operational data are further operable to cause the one or more processors to:

receive a first message from the second entity to the first entity and not addressed to a specific first user of the plurality of first users;
select a recipient from among the plurality of first users and transmitting the first message to the recipient;
direct subsequent messages from the second entity to the recipient;
store the first message and subsequent messages in the conversation object.

\* \* \* \* \*